US007047305B1

(12) United States Patent
Brooks et al.

(10) Patent No.: US 7,047,305 B1
(45) Date of Patent: May 16, 2006

(54) PERSONAL BROADCASTING SYSTEM FOR AUDIO AND VIDEO DATA USING A WIDE AREA NETWORK

(75) Inventors: Roger K. Brooks, Palo Alto, CA (US); Yanda Ma, Milpitas, CA (US); Dave M. Singhal, San Jose, CA (US); Xia Hong, San Jose, CA (US)

(73) Assignee: Vidiator Enterprises Inc., Nassau (BS)

( * ) Notice: Subject to any disclaimer, the term of this patent is extended or adjusted under 35 U.S.C. 154(b) by 0 days.

(21) Appl. No.: 09/539,193

(22) Filed: Mar. 30, 2000

Related U.S. Application Data

(60) Provisional application No. 60/170,079, filed on Dec. 9, 1999.

(51) Int. Cl.
G06F 15/16 (2006.01)
H04N 3/16 (2006.01)
H04N 5/257 (2006.01)
H04N 5/76 (2006.01)
H04N 7/16 (2006.01)

(52) U.S. Cl. .................. 709/231; 348/207.99; 386/38; 725/74; 725/118

(58) Field of Classification Search ................ 709/230, 709/231, 236; 375/240; 348/400, 220, 36, 348/446, 705, 207.99; 386/101, 126, 38; 345/716, 204; 707/100; 725/91, 116, 74, 725/118; 248/222; 715/716
See application file for complete search history.

(56) References Cited

U.S. PATENT DOCUMENTS 5,032,927 A * 7/1991 Watanabe et al. ........ 348/400.1
5,091,782 A * 2/1992 Krause et al. ........... 348/400.1
5,343,243 A * 8/1994 Maeda ..................... 348/222.1
5,343,254 A * 8/1994 Wada et al. ................ 348/627
5,422,674 A * 6/1995 Hooper et al. ......... 375/240.15

(Continued)

OTHER PUBLICATIONS

ITU-T Recommendation H.222.0. Feb. 2000. ITU-T.*

*Primary Examiner*—Ayaz Sheikh
*Assistant Examiner*—Christian LaForgia
(74) *Attorney, Agent, or Firm*—Seed IP Law Group PLLC

(57) ABSTRACT

A system for transferring real time video information from a source device to one of a plurality of output devices includes an image capturing device for acquiring video information, the image capturing device comprising a processor, a graphics module coupled to the processor, a browsing device coupled to the processor, a packetizing portion coupled to the processor, the packetizing portion being adapted to convert the video information into a packetized stream of information, the packetized stream of information being in a first format, and an output device coupled to the processor for transferring the packetized stream of information to a network, a network gateway coupled to the image capturing device through the network, the network gateway being coupled to a worldwide network of computers, the network gateway comprising a gateway transcoding device for converting the packetized stream of information from the first format to a second format, the network gateway also comprising a packetizing portion for transferring the packetized stream of information in the second format to the network, and a display device coupled to the network gateway through the world wide network of computers, the display device comprising a display device for converting the packetized stream of information into video information for display, the display device also comprising a display for displaying the video information on the display device.

48 Claims, 20 Drawing Sheets

U.S. PATENT DOCUMENTS

| | | | | |
|---|---|---|---|---|
| 5,434,590 A | * | 7/1995 | Dinwiddie et al. | 345/634 |
| 5,570,128 A | * | 10/1996 | Kawahara | 348/222.1 |
| 5,572,254 A | * | 11/1996 | Kawahara | 348/222.1 |
| 5,602,589 A | * | 2/1997 | Vishwanath et al. | 375/240.11 |
| 5,737,595 A | * | 4/1998 | Cohen et al. | 707/100 |
| 5,909,250 A | * | 6/1999 | Hardiman | 375/240.03 |
| 5,917,552 A | * | 6/1999 | Van Court | 348/558 |
| 5,923,384 A | * | 7/1999 | Enomoto et al. | 348/705 |
| 5,936,968 A | * | 8/1999 | Lyons | 370/503 |
| 5,970,233 A | | 10/1999 | Liu et al. | 395/200.76 |
| 6,014,694 A | * | 1/2000 | Aharoni et al. | 709/219 |
| 6,037,991 A | * | 3/2000 | Thro et al. | 725/116 |
| 6,043,837 A | * | 3/2000 | Driscoll et al. | 348/36 |
| 6,064,437 A | * | 5/2000 | Phan et al. | 348/446 |
| 6,091,777 A | | 7/2000 | Guetz et al. | 375/240 |
| 6,094,219 A | * | 7/2000 | Roberts et al. | 348/220.1 |
| 6,141,447 A | | 10/2000 | Linzer et al. | 382/236 |
| 6,147,703 A | * | 11/2000 | Miller et al. | 348/220.1 |
| 6,160,544 A | * | 12/2000 | Hayashi et al. | 715/716 |
| 6,166,729 A | | 12/2000 | Acosta et al. | 345/327 |
| 6,192,196 B1 | * | 2/2001 | Keller | 396/20 |
| 6,201,356 B1 | | 3/2001 | Ushijima et al. | 315/282 |
| 6,201,536 B1 | * | 3/2001 | Hendricks et al. | 345/716 |
| 6,212,550 B1 | | 4/2001 | Segur | 709/206 |
| 6,219,089 B1 | * | 4/2001 | Driscoll et al. | 348/36 |
| 6,256,453 B1 | * | 7/2001 | Takano | 386/126 |
| 6,275,536 B1 | | 8/2001 | Chen et al. | 375/240.25 |
| 6,278,739 B1 | * | 8/2001 | Enomoto et al. | 375/240.26 |
| 6,288,753 B1 | * | 9/2001 | DeNicola et al. | 348/586 |
| 6,292,834 B1 | | 9/2001 | Ravi et al. | 709/233 |
| 6,297,794 B1 | * | 10/2001 | Tsubouchi et al. | 345/204 |
| 6,298,385 B1 | | 10/2001 | Sparks et al. | 709/233 |
| 6,329,981 B1 | * | 12/2001 | Lin et al. | 345/204 |
| 6,331,869 B1 | * | 12/2001 | Furlan et al. | 348/36 |
| 6,337,708 B1 | * | 1/2002 | Furlan et al. | 348/36 |
| 6,343,313 B1 | | 1/2002 | Salesky et al. | 709/204 |
| 6,356,945 B1 | * | 3/2002 | Shaw et al. | 709/231 |
| 6,385,772 B1 | | 5/2002 | Courtney | 725/105 |
| 6,392,692 B1 | | 5/2002 | Monroe | 348/143 |
| 6,412,004 B1 | | 6/2002 | Chen et al. | 709/226 |
| 6,412,008 B1 | | 6/2002 | Fields et al. | 709/228 |
| 6,452,355 B1 | | 9/2002 | Forster et al. | 318/569 |
| 6,453,355 B1 | | 9/2002 | Jones et al. | 709/230 |
| 6,457,052 B1 | | 9/2002 | Markowitz et al. | 709/225 |
| 6,477,708 B1 | * | 11/2002 | Sawa | 725/116 |
| 6,490,627 B1 | | 12/2002 | Kalra et al. | 709/231 |
| 6,539,547 B1 | * | 3/2003 | Driscoll et al. | 725/91 |
| 6,567,986 B1 | | 5/2003 | Ward et al. | 725/118 |
| 6,647,425 B1 | | 11/2003 | Chaddha | 709/233 |
| 6,754,439 B1 | * | 6/2004 | Hensley et al. | 386/111 |
| 6,806,909 B1 | * | 10/2004 | Radha et al. | 348/384.1 |
| 2003/0106063 A1 | | 6/2003 | Guedalia | 725/90 |

* cited by examiner

Mapping:

Resolution = Desplay

| Player | ProtocolType |
|---|---|
| LuxPlayer | RTP |
| Others | TCP |

501

| DeviceType | ColorDepth |
|---|---|
| CellPhone | 1bit |
| PDA | 2bit |
| WinCE | 4bit |
| PC | 24bits |

502

| QoS Bandwidth | FrameRate |
|---|---|
| 14.4kbps | 1fps |
| 28.8kbps | 2fps |
| 33.6kbps | 4fps |
| 128kbps | 8fps |
| 324kbps | 15fps |
| >324kbps | 30fps |

503

| Player | ColorDepth | Processor | StreamFormat |
|---|---|---|---|
| Browser | 1bit, 2bits | ANY | MotionGIF |
| Browser | >2bits | ANY | MotionJPEG |
| ANY | 1bit, 2bits | <266MHz | MotionGIF |
| ANY | >2bits | <266MHz | MotionJPEG |
| Otherwise | | | MPEG/MP3 audio |

Client Mobile Device Capability:

| DeviceType | Processor | OS | Player | Display | Bandwidth |
|---|---|---|---|---|---|
| PDA | 16bit | PalmOS | Browser (no javascript) (no audio) | 160x120 | 14kbps |

Map to internal structure:

| StreamFormat | Resolution | ColorDepth | FrameRate | ProtocolType |
|---|---|---|---|---|
| MotionGIF | 160x120 | 2bit | 1fps | TCP |

US 7,047,305 B1

PERSONAL BROADCASTING SYSTEM FOR AUDIO AND VIDEO DATA USING A WIDE AREA NETWORK

CROSS REFERENCES TO RELATED APPLICATIONS

The present application claims priority to and is a continuation in part of U.S. Ser. No. 60/170,079 filed Dec. 9, 1999, commonly owned, and hereby incorporated by reference. Additionally, the following commonly-owned co-pending applications, including this one, are being filed concurrently and the others are hereby incorporated by reference in their entirety for all purposes:
  A. U.S. patent application Ser. No. 09/539,728;
  B. U.S. patent application Ser. No. 09/539,492;
  C. U.S. patent application Ser. No. 09/539,194.

BACKGROUND OF INVENTION

The present invention relates generally to digital video processing techniques. More particularly, the invention provides a technique including a system for capturing audio and video information from a first source and displaying such video and audio information at a second source, where the format of the first source and the format of the second source are different from each other. Merely by way of example, the present invention can be applied to a wireless communication environment. It would be recognized, however, that the invention has a much broader range of applicability. For example, the invention can be applied to devices such as personal computers, personal digital assistants, cellular phones, lap top computers, note book computers, work stations, television sets, web appliances, all other devices which can communicate over a network and which are capable of outputting audio and/or video.

Long distance wireless communication has evolved over many years of human development. At one time, people communicated to each other over extended geographical locations by primitive wireless methods. Yelling or shouting often provided the only way to communicate from one person to another person in a wireless manner. Face to face yelling or shouting was often very effective. Such yelling, however, was often limited to the strength of the yelling person's voice, which could generally not carry greater than 300 feet or so. Additionally, environmental factors such as rain, wind, or snow limited the length of distance that could be communicated over effectively. Although effective for close distances, long distance wireless communication over larger geographical spans would often be ineffective.

Other ways of communicating using a wireless medium followed. For example, drumbeats replaced, in part, yelling or shouting. Certain tribal people communicated over great geographic distances to inform others of "danger" or the like used drumbeat signals. These signals were effective for some applications but still involved physical human means for implementing and carrying out the signals. Depending upon the strength of the person, drumbeats provided limited intensity. Additionally, drumbeats possessed poor "signal to noise" after a certain distance. Accordingly, drumbeats had to be replaced, at least in part. In some cultures, carrier pigeons carried messages between people over extended geographic areas. Small messages, which were written on scraps of paper, often attached to legs of carrier pigeons, which flew from one location to another location. In many urban areas, these carrier pigeons were quite effective in sending messages. Although somewhat effective, many limitations still existed. For example, only a limited amount of information could be attached to the small legs of the carrier pigeon. Additionally, carrier pigeons often died, when diseased. Further, carrier pigeons required feed and had to be cleaned, since they were quite messy. Accordingly, carrier pigeons also had to be replaced.

Many of these primitive techniques have been replaced by radio, cellular phones, television, and other modern day communication means. These communication means were often good for communicating a certain type of information. For example, radio transmits voice information, such as people, songs, and the like, which is broadcast to a plurality of users. Cellular phones also transmit voice information. Such phones provide user to user communication. An example of a modern day technology for cellular phones is a technology commonly called "CDMA" developed by Qualcomm of San Diego, Calif. CDMA allows a user of a cellular phone to call anyone from anywhere in a mobile manner in the United States. Television similar to radio also provided broadcast communication of video programs to a wide variety of users. Television would be broadcast using television towers or satellites and the like.

Despite the availability of these modern day techniques, numerous limitations still exist. All of these techniques often have different formats, which make information difficult to transfer from one device type to another device type. Such formats are also difficult to control especially for a combination of audio and video information. Further, each of these techniques is often single purpose, which also limits use of each of these techniques. Additionally, video broadcasting for personal content information could not be distributed effectively, since many end user devices often used different formats and the like. Although there have been many advances, there are still numerous limitations, as noted.

From the above, it is seen that a technique for providing video information to people in an improved manner is highly desirable.

SUMMARY OF THE INVENTION

According to the present invention, techniques including a system for digital video processing are provided. In an exemplary embodiment, the present invention provides a system for personal broadcasting where the source audio/video and the displayed audio/video can be in a different format.

In a specific embodiment, the present invention provides a system for transferring real time video information from a source device to one of a plurality of output devices. The system includes an image-capturing device for acquiring video information. The image capturing device comprises a processor, a graphics module coupled to the processor, a browsing device coupled to the processor, an image capturing transcoding device coupled to the processor, and an output device coupled to the processor for transferring the packetized stream of information through a wireless medium. The image capturing transcoding device adapted to convert the video information into a packetized stream of information. The packetized stream of information is in a first format. The system also has a network gateway coupled to the image-capturing device through the wireless medium. The network gateway coupled to a worldwide network of computers. The network gateway comprises a gateway transcoding device for converting the packetized stream of information in the gateway from the first format to a second format. The network gateway also comprises an output device for transferring the packetized video information in the second format. The system has a display device coupled to the network gateway through the worldwide network of computers. The display device has a display and a transcoding device for converting the packetized video information into video information for display. The display device also has a display for displaying the video information on the display device through a browsing device.

In an alternative specific embodiment, the present invention provides a system for personal broadcasting from a mobile image capturing device to one or more mobile display devices and a client device through a gateway server. The system has a personal broadcasting web site coupled to a wide area network of computers and coupled to a wireless network. The system also has a transcoding module coupled to the personal broadcasting web site to covert an incoming audio/video signal from a first format into a second format for use in a wireless remote device. A look up table coupled to the personal broadcasting web site for selecting a processing module for converting the audio/video signal from the first format to the second format is also included. The processing module is one of a plurality of processing modules for converting an audio/video signal from one format into another different and often incompatible format.

According to yet another embodiment of the present invention, a system for personal broadcasting to a mobile display device is described that includes a processor, and a personal broadcasting server coupled to the processor and coupled to a wide area network of computers. The personal broadcasting server includes an image retrieval portion configured to retrieve incoming video signals in a first format, a look up table coupled to the personal broadcasting web site for determining parameters for a second format for the incoming video signals, and a transcoding module coupled to the image retrieval portion and to the look up table, the transcoding module configured to convert the incoming video signal from the first format into the second format in response to the parameters.

According to yet another embodiment of the present invention, a distributed system for broadcasting personal streaming data includes a video data source coupled to a network, the video data source configured to provide an output stream of video data, the output stream of video data having a first set of video parameters, a client device coupled to the network, the client device configured to receive an input stream of video data, the input stream of video data having a second set of video parameters, and configured to output a device identifier, and a gateway server coupled to the video data source and to the client device across the network, the gateway server configured to receive the output stream of video data and to receive the device identifier, and in response to generate the input stream of video data in response to the device identifier. At least one parameter in the first set of video parameters is larger than a corresponding parameters of the second set of video parameters.

Numerous benefits may be achieved by way of the present invention over conventional techniques. In some embodiments, the present invention provides an easy to implement personal broadcasting system using conventional analog or digital video cameras and the like. The invention also provides a way for one mobile device to communicate audio/video with another mobile or wireless device, even if the devices are not generally compatible with each other. In other aspects, the invention provides a novel broadcast server, which is coupled to a worldwide network of computers, including an internet or the Internet. Depending upon the embodiment, one or more of these benefits may exist.

These and other benefits are described throughout the present specification and more particularly below.

BRIEF DESCRIPTION OF THE DRAWINGS

FIG. 5 illustrates an embodiment of the present invention;

DETAILED DESCRIPTION OF THE INVENTION

Figure 1:
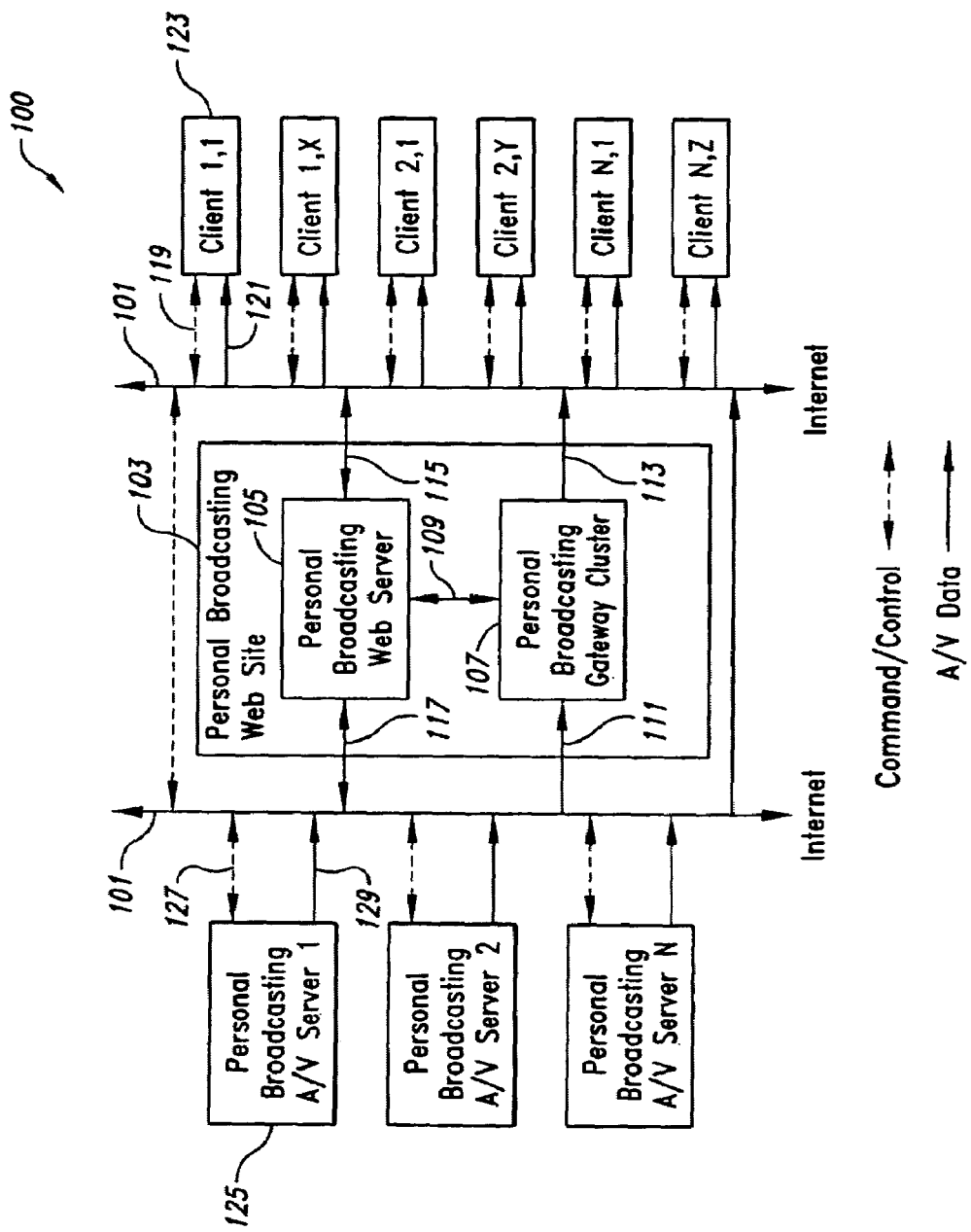
FIG. 1 is a simplified diagram of a broadcasting system according to an embodiment of the present invention.

FIG. 1 is a simplified diagram of a broadcasting system 100 according to an embodiment of the present invention. This diagram is merely an example, which should not unduly limit the scope of the claims herein. One of ordinary skill in the art would recognize many other variations, modifications, and alternatives. In an exemplary embodiment, the present invention provides a personal broadcasting system for broadcasting personal video and audio. As shown, the broadcasting system includes a variety of elements such as a world wide network of computers 101, which can be an internet, the Internet, or the like. The network can be coupled to an alternative wide area network, a local area network, an intranet, any combination thereof, and others.

Central in the system is a personal broadcasting web site 103 or Web site, which is coupled to the network. Personal broadcasting web site includes many elements such as a personal broadcasting web server ("PBWS") coupled to a personal broadcasting gateway cluster, which will be described later. Personal broadcasting web server provides command and control information, as shown by the dotted lines, between the gateway cluster, a plurality of client devices 123, and a plurality of personal broadcasting audio/video servers 125. Other devices can also exist in the network. Each of the plurality of audio/video servers provides audio/video data to be broadcast either to a group of viewers, a single user, the public, or any combination thereof. Each of the viewers is defined by each of the client devices 123, which are also coupled to the worldwide network.

Figure 1A:
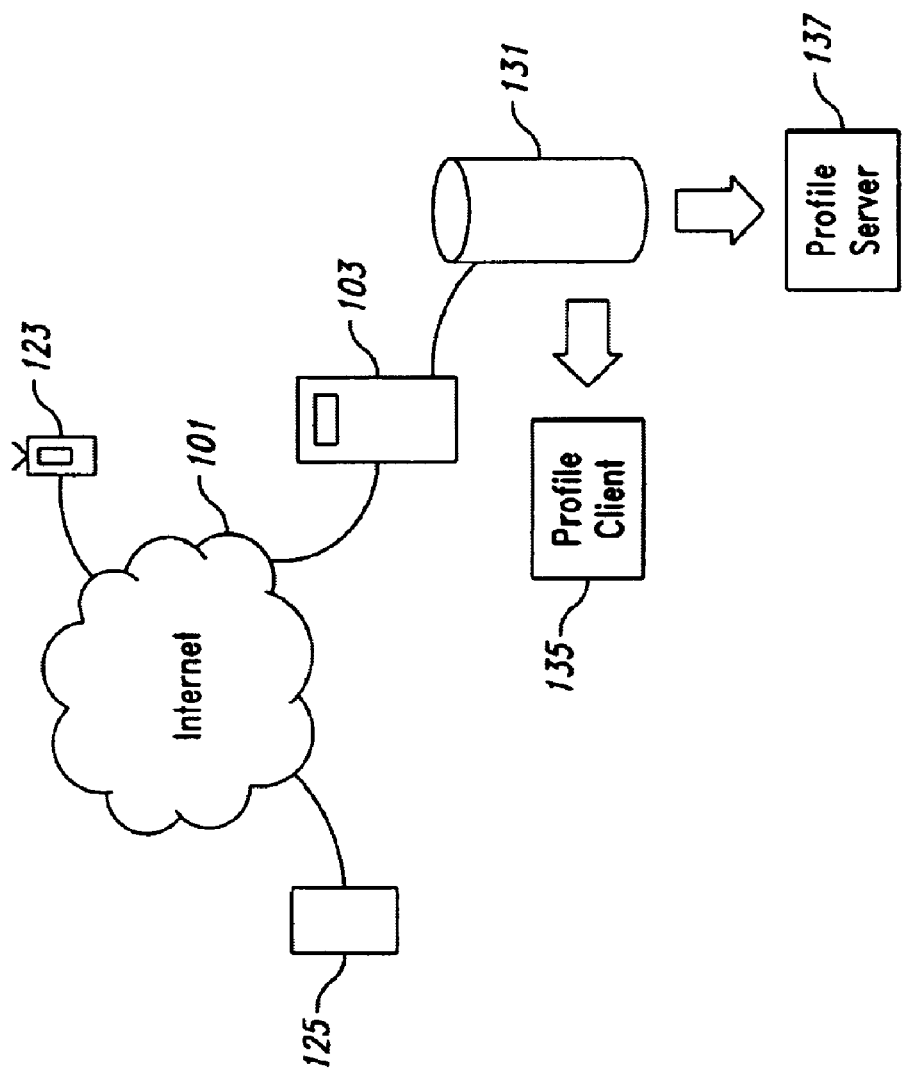
FIG. 1A is a simplified diagram of an audio/video server according to an embodiment of the present invention.

The personal broadcasting web site can be accessed by any of the servers. Each of the servers is a source of audio/video data. As merely an example, FIG. 1A is a simplified diagram of an audio/video server according to an embodiment of the present invention. This diagram is merely an example that should not limit the scope of the claims herein. One of ordinary skill in the art would recognize many other variations and modifications. As shown, like reference numerals are used in this Fig. as some of the other Figs. for cross referencing purposes. The web site 103 is coupled to the Internet 101. The web site includes a database 131, which stores profile information 135 for each of the client devices. Profile information 137 is also stored for each of the personal broadcasting audio/video servers. Profile information is entered into the web site by any of the techniques described herein and others. Further details of the profile information is provided below. The personal broadcasting web site transfers audio/video data from the website to the plurality of client devices 123, e.g., 11, 1X, 21, 2Y, N1, NZ. The client devices can include a personal computer, a work station, an internet appliance, and a mobile computing device. The mobile computing device is preferred. Here, the mobile computing device includes a browsing device which couples to the personal broadcasting audio/video servers. Details of the mobile computing device is provided in U.S. Ser. No. 09/502,549, commonly assigned, and which is incorporated by reference for all purposes.

Figure 2:
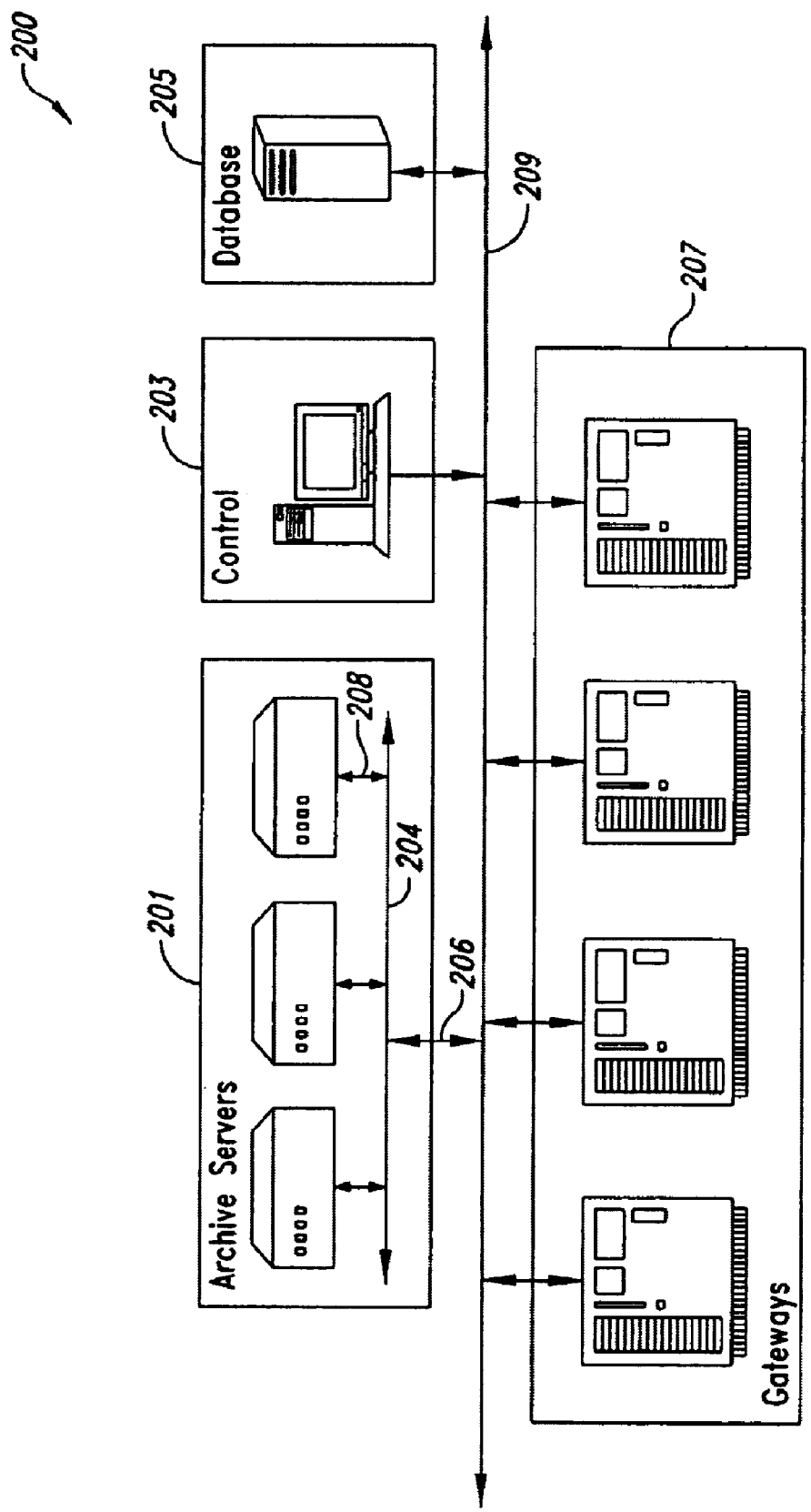
FIG. 2 is a simplified diagram of a personal broadcasting gateway cluster according to an embodiment of the present invention.
Figure 2A:
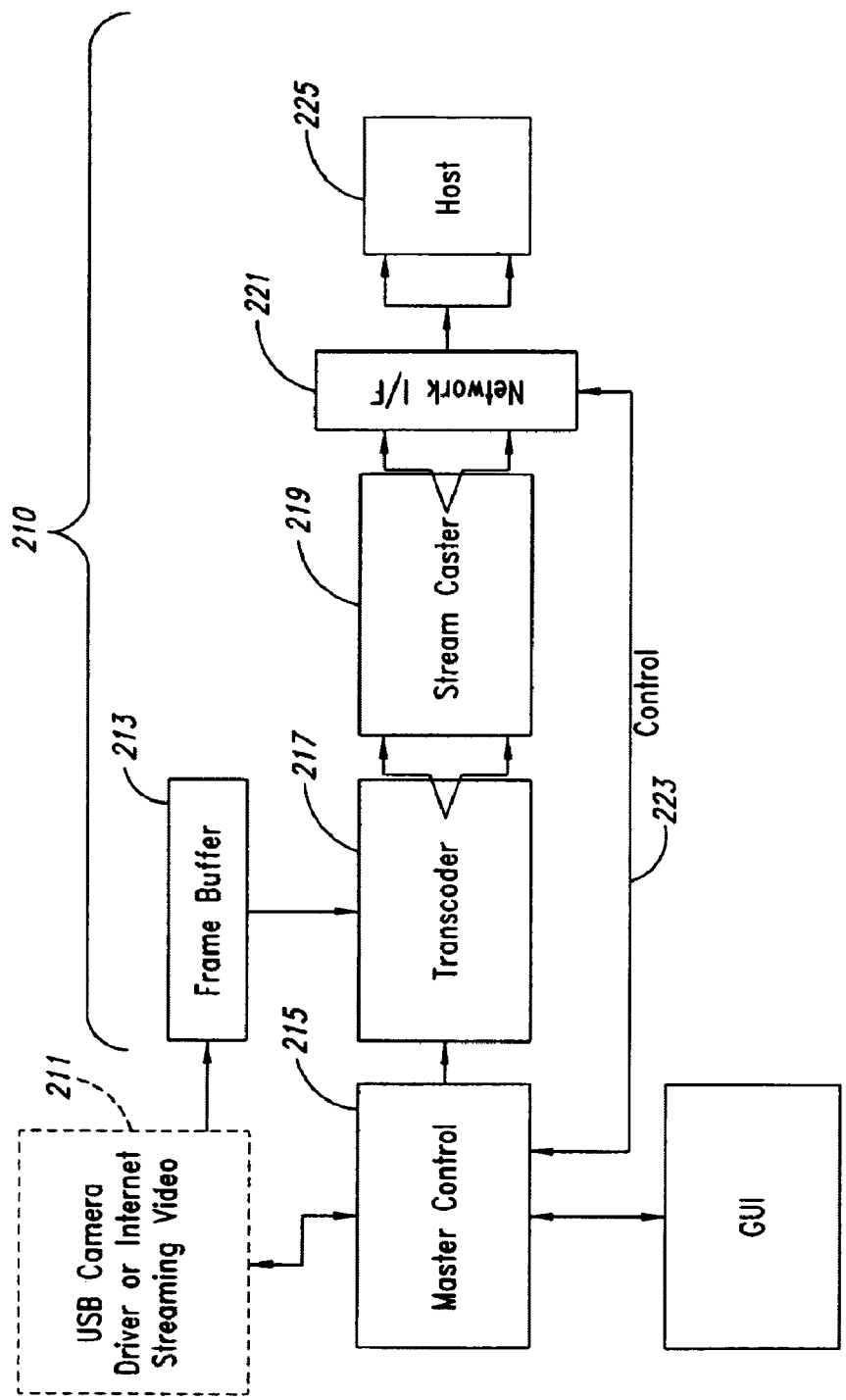
FIGS. 2A to 2E are simplified diagrams of video information stream flows according to embodiments of the present invention.

FIG. 2 is a simplified diagram of a personal broadcasting gateway cluster 200 according to an embodiment of the present invention. This diagram is merely an example, which should not unduly limit the scope of the claims herein. One of ordinary skill in the art would recognize many other variations, modifications, and alternatives. As shown, the gateway cluster 200 includes a variety of elements such as a plurality of archive servers; which are each coupled to each other through common line 204, which is coupled via line 206 to the Internet 209. Archive servers are coupled to control 203 server, which is also coupled to the Internet. Other elements include a database coupled to the network and a plurality of gateway servers 207, which are each coupled to the Internet. The gateway cluster interfaces with the personal broadcasting web server for control information. Audio/video data from any of the server devices are distributed to one client, a group of clients, or to the public, or any combination thereof.

In a specific embodiment, each of the archive servers includes a processing unit coupled to a mass memory device. The mass memory device is capable of storing streaming video. Here, the mass memory device can be a variety of devices such as a tape device, a hard disk drive, a removable hard disk drive, floppy drive, optical drives, and many other drives. Each of these servers can be coupled to each other through a common bus 204 for scaling purposes. Here, additional servers can be added without any detrimental influence in performance or the like. In a specific embodiment, each of the gateway devices is also coupled to a common interface such as the Internet. Accordingly, it is possible to add additional gateway servers without any detrimental influence in performance and the like.

FIGS. 2A to 2E are simplified diagrams of video information stream flows according to embodiments of the present invention. These diagrams are merely examples which should not limit the scope of the claims herein. One of ordinary skill in the art would recognize many other variations, modifications, and alternatives. FIGS. 2A to 2E are simplified diagrams of video information stream flows according to embodiments of the present invention. These diagrams are merely examples which should not limit the scope of the claims herein. One of ordinary skill in the art would recognize many other variations, modifications, and alternatives. As shown, FIG. 2A includes a video device drive 211, which generates video data. The video data is compressed into a first compressed packetized stream, which is transferred to the personal broadcasting web site 210 via the Internet or the like. Details of such technique is described in U.S. Ser. No. 09/502,549, commonly assigned and hereby incorporated by reference. For easy reading, video device driver is used herein as data acquisition block, which can be a part of the web site.

As shown, the video device transfer compressed data through the Internet to a frame buffer 213. In the present embodiment, frame buffer 213 is used to buffer the stream of video data from data acquisition block, for processing by transcoder block 217. In this embodiment, the type of data and the rate at which frame buffer is updated are fixed by data acquisition block 211, under control of control block 215. In this embodiment, the data stored in frame buffer 213 may include pixels of video data having associated values (uncompressed); frames of video data that have been compressed with a quantized DCT operation; and the like. In one embodiment of the present invention, the video data may be stored in RGB component space, YUV component space, HSV component space, gray scale, and the like.

In one embodiment of the present invention, frame buffer 410 typically includes one or two buffers, each having a frame size of approximately 800 horizontal pixels by 600 vertical pixels (800×600). Each buffer typically has a bit-depth of at least 24 bits in one embodiment. Frame buffer 410 is typically minimally embodied as a 3 Megabyte DRAM, although larger sized memories may also be used. Alternatively, SRAM devices or embedded DRAM, or the like may also be used. In this embodiment, transcoder block 215 retrieves incoming data from frame buffer 213 fully decompresses or partially decompresses the data, reduces the bandwidth of the data, and forms a stream of output data in a desired format. Transcoder block 217 receives the bandwidth requirements and the desired output format from control block 215. Further detail regarding transcoder block 217 will be given below.

In the present embodiment, stream caster block 219 is typically used to receive a stream of output video data from transcoder block 217 and to format the data for transmission to network interface 221. In this embodiment, network protocols used include TCP/IP protocols, although in other embodiments, other network protocols may also be used. In this embodiment, stream caster block 219 packetizes the output data stream, and determines IP addresses, payload lengths, and the like. Further, stream caster block 219 forwards the data segments into the appropriate TCP socket of network interface 221.

In this example, network interface 221 receives the segmented data from stream caster 219 and transmits the data to a network. The network, may be a computer network such as the Internet, a LAN, or the like. In the present embodiment, the network is TCP/IP based. In the present embodiment, network interface 221 is used to create, monitor, and close all the TCP/IP sockets and RTSP. In this embodiment, network interface also sends and receives data to and from a network via the TCP/IP sockets and sends incoming data to control block 215. In alternative embodiments, network interface may use other network protocols such as IPX, and other conventional and future-developed network protocols. Further, network interface 221 may use other data streaming protocols such as RTP, and any other conventional and future-developed streaming protocol.

Figure 2B:
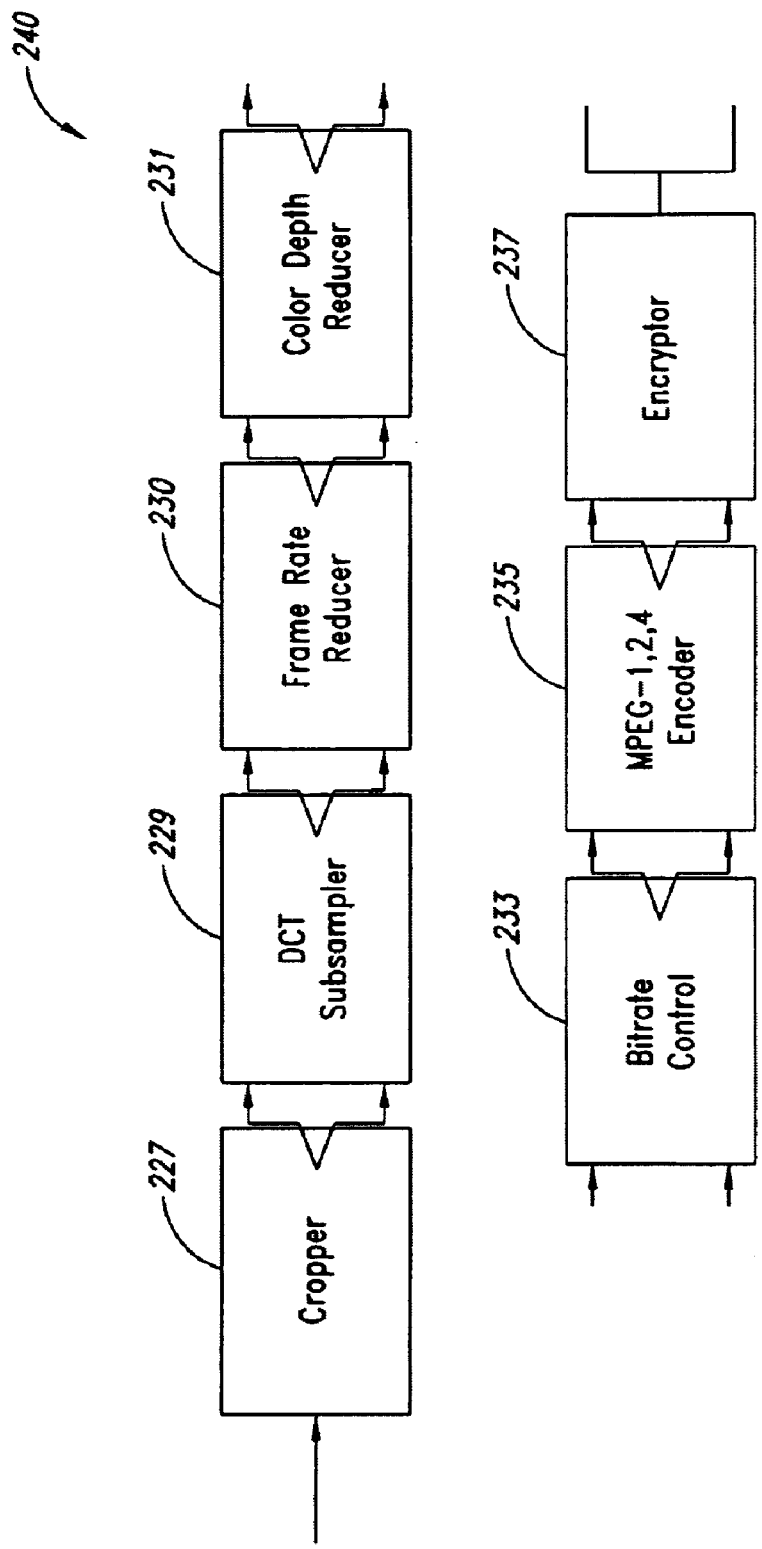

FIG. 2B illustrates a simplified block diagram according to an embodiment of the present invention. In particular, FIG. 2B illustrates functional blocks available in a transcoder 240 according to one embodiment. Transcoder 240 includes a cropper block 227, a sampler block 229, a frame rate block 230, a color depth block 231, a bit rate control block 233, an encoder block 235, and an encryptor block 237. As was illustrated in FIG. 2A, transcoder is coupled to a frame buffer, and outputs data to stream caster, in the present embodiment.

In FIG. 2B, cropper block 227 retrieves frames of data from frame buffer. In this embodiment, cropper block extracts a rectangular region of data from each frame retrieved from frame buffer. The extents of the rectangular region are specified in a "stream table" when receiving streaming video data. If no cropping is specified, cropper block 227 merely grabs the whole frame. Cropping is specified when there is a particular portion within a video frame that the requester wants to see.

Also illustrated in FIG. 2B is a sampler block 229 that receives input from cropper block 227. In this embodiment, sampler block receives a desired output spatial resolution from control block. In one embodiment of the present invention, sampler block, subsamples the image received from cropper block, to obtain the desired output resolution. As an example, an incoming frame may have 640 horizontal pixels×480 vertical pixel resolution, however the desired output video image is 80 pixels×60 pixels. In such an example, cropper block may simply take every eighth pixel of the incoming frame for the output frame. Other methods of subsampling are also contemplated, for example, cropper block may average eight pixels to obtain the value for the output pixel. Other methods, such as filtering, for subsampling are contemplated in alternative embodiments of the present invention.

In another embodiment, sampler block 229, supersamples the image from cropper block, to obtain the desired output resolution. As an example, an incoming frame may have an 80×60 pixel resolution, however the desired output video image has a 640×480 pixel resolution. An example of this may be a hand-held wireless video camera transmitting live video to a newsroom computer via the Internet. In such an example, cropper block may use any conventional method for upscaling the image. For example, cropper block may use pixel replication, with or without bi-linear, or bi-cubic filtering techniques, and the like. Other methods for upscaling the incoming frame are contemplated in alternative embodiments of the present invention.

In the present example, frame rate block 230 receives the sampled frames of data from cropper block. Frame rate block 230 also receives an indication of a desired frame rate for output video from control block, typically in frames per second (fps). In the present embodiment, control block also knows the frame rate of the incoming video, also in fps. This frame rate is also sent to frame rate block.

In one embodiment, of the present invention, frame rate block compares the incoming frame rate to the desired output frame rate, and adjusts the number of frames accordingly. For example, frame rate block will drop frames of data to lower the number of frames per second, or will add frames of data to increase the number of frames per second. In the case where the output frame rate is lower than the input frame rate, frame rate block may use a counter to count to a specific number. When the number is reached, the current frame is dropped, or alternatively, the current frame is not dropped. For example, if the desired frame rate is 10 fps and the incoming frame rate is 11 fps, every time a counter counts to 10, the next frame is simply dropped. As another example, if the desired output frame rate is 5 fps, and the incoming frame rate is 30 fps, every time the counter counts to 6, the next frame is not dropped, but is passed to the next functional block.

In another embodiment, frame rate block may be embodied as a first-in first-out frame (fifo) stack. In such an example, frames of input video are stored in a buffer location specified by a write pointer, and frames of output video are retrieved from a buffer location specified by a read pointer. In operation, every incoming video frame is written into the fifo stack, however, only when the frame is to be output is the write pointer incremented. In such a case, data read out of the fifo stack may be sequential. Still other methods for reducing the frame rate are contemplated in alternative embodiments of the present invention.

In an alternative embodiment of the present invention, frame rate block adds frames to increase the frame rate. For example, if the incoming frame rate is 10 fps, and the desired frame rate is 20 fps, frame rate block 530 will add frames to the video stream every other frame. One technique for increasing the numbers of frames involves interpolating the motion vectors of blocks in the frames. Many other methods for adding frames and increasing the frame rate are contemplated in alternative embodiments of the present invention, however are outside the scope of the present technical disclosure.

In the example in the Fig., color depth reducer block 231 sequentially receives the frames of data from frame rate block. In one embodiment, color depth reducer block also receives an indication of the bit-depth for pixels in the incoming frame of data, and the desired bit-depth. In the present embodiment, in response to the bit depths, color depth reducer block 231 maps the number of bits from the input frame to the desired number of bits in the output frame.

As an example, the incoming image may have a 30 bit bit-depth, for example three component color having 10 bits of hue data, 10 bits of saturation data, and 10 bits of intensity data; the desired bit depth of the output frame may be 6 bit gray scale. In such an example, to reduce the color depth, color depth reducer block may take only the 6 most significant digits in the intensity data for the output frame.

In another example, the incoming image may have a 24 bit bit-depth, for example, an RGB image having 24 bits of information (8:8:8), and the desired bit depth of the output frame may be 256 colors, or 8-bit color. In such an example, color depth reducer may re-map or dither, the values from the 24 bit color space into the 8 bit color space. Such dithering techniques are well known. In alternative embodiments, other types of techniques may be used to reduce the bit depth from an input video frame to obtain a desired output frame bit-depth. In alternative embodiments of the present invention, increasing the color bit-depth may also be performed, using known techniques In the present embodiment, bitrate control block 233 receives the output from color depth reducer block. In the present embodiment, bit rate control block also receives a desired output bit rate from control block. For M-JPEG encoding, bit rate control block 233 is used to statistically compute a new quantization scale factor for the data so that the effective bit rate more closely matches the desired output bitrate.

In the present embodiment, a quantization scale factor is first determined. The quantization scale factor is used to compress or expand a frame of data so that it more closely matches the desired output bit rate. In theory, in one embodiment the quantization scale factor is equivalent to a modulus (Mod) operator, or a most significant bits (MSBs) operator. In such cases, the differences between pixels that are close in value (e.g. 20 and 21), are ignored. As another example, values 20–23 may be considered the same as 20. In this example, the quantization scale factor is determined by analyzing the number of bits per second are produced by a t0 frame of data. The number of bits is divided by the frame time to obtain a calculated bit rate in this embodiment. This calculated bit rate is compared to a desired bit rate to obtain the quantization scale factor.

The quantization scale factor is then applied to scale the next frame of data, a t1 frame of data. Continuing the example above, the next frame of data may be scaled by 2, so that the bit rate of the next frame of data will be 10 kbps. In the present embodiment, bit rate scaling is performed by reducing the effective color depth by the quantization scale factor, to meet the desired bandwidth requirements. In this example, the color depth is halved, i.e. the bottom least significant bits (LSBs) are ignored.

In one embodiment of the present invention, bit rate control block monitors each frame, and attempts to control the bit rate to match the desired output bit rate for virtually all frames. In some embodiments, the quantization scale factor is updated every frame time, and in other embodiments, the quantization scale factor may be updated every Xth frame time. Where X is selectable automatically or manually.

In an alternative embodiment, a more simplistic techniques is utilized. In such an embodiment, if the incoming bit rate is above the desired output bit rate, a predetermined quantization scale factor is applied to the next frame. Further, if the incoming bit rate is below the desired output bit rate, another predetermined quantization scale factor is applied to the next frame. In such an embodiment, such predetermined quantization scaling factors may be selected ahead of time, based on empirical data, or the like. Still, in other embodiments of the present invention may provide for increasing the effective bit rate. Encoding block 235 next receives the bit-rate adjusted frames of data. Encoding block may also receive a request for an encoding data format, specified for by control block. Encoding block is embodied as an MPEG encoder. Encoding block may include dedicated hardware encoders, such as those available from Sigma Designs, and the like.

In the present embodiment, for MPEG-1, MPEG-2, and MPEG-4 encoding, it is contemplated that I-frame data will be compressed. In another embodiment, P-frames, and even B-frames may also be compressed. For MPEG-4 encoding, it is contemplated that both I-frame data and P-frame data be compressed for transmission purposes. Detail description of I, P, and B frames are outside the scope of this technical disclosure. In other embodiments of the present invention, alternative formats may specified, for example *.avi format video, *.mov format video, streaming video such as in the *.rm format from REAL NETWORKS, or *.asf format from MICROSOFT, or the like. Such formats may be in the public domain, or proprietary. Further, encoding block 560 may be embodied as specialized dedicated hardware, or as software routines on a digital signal processor (DSP), a microprocessor (ATHLON, PENTIUMIII), or the like. After encoding, the video data may be encrypted by encryptor block 237.

The above embodiment was illustrated in the Fig. as having specified interconnections between blocks. However, in alternative embodiments of the present invention, the different blocks may be interconnect in different ways, and may be dynamically interconnected in different ways. As an example, an incoming frame may include 24-bits of 640× 280 color image whereas the desired output image is an 8 bit 80×60 gray scale image. In such an example, it is preferable to reduce the color depth information, before subsampling the image for sake of efficiency. In such a case, the data is passed to the color depth reducer 540 then to the sampler block. The interconnections between the blocks, and the data flow may be dynamic, and change according to specific need.

Figure 2C:
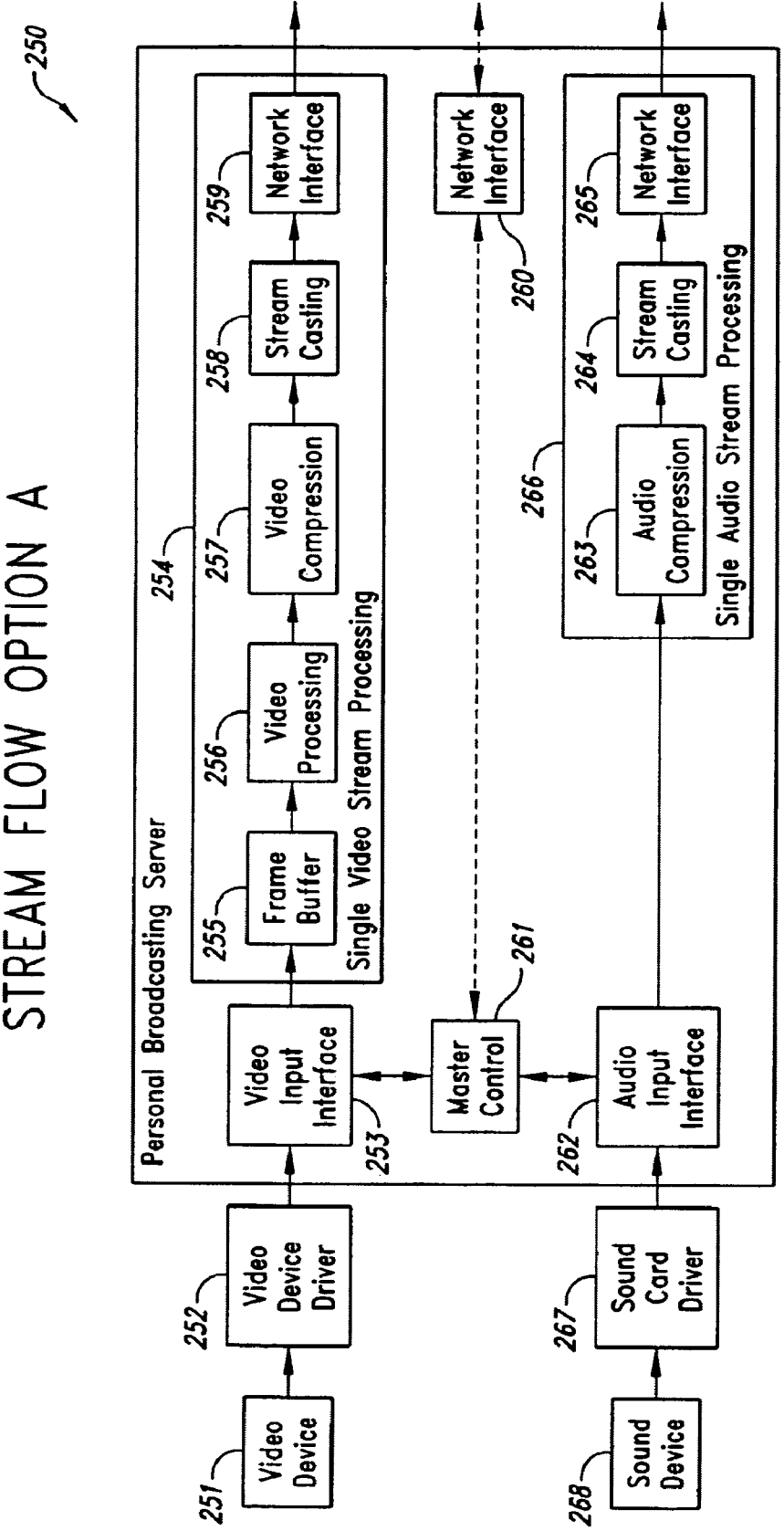
Figure 2D:
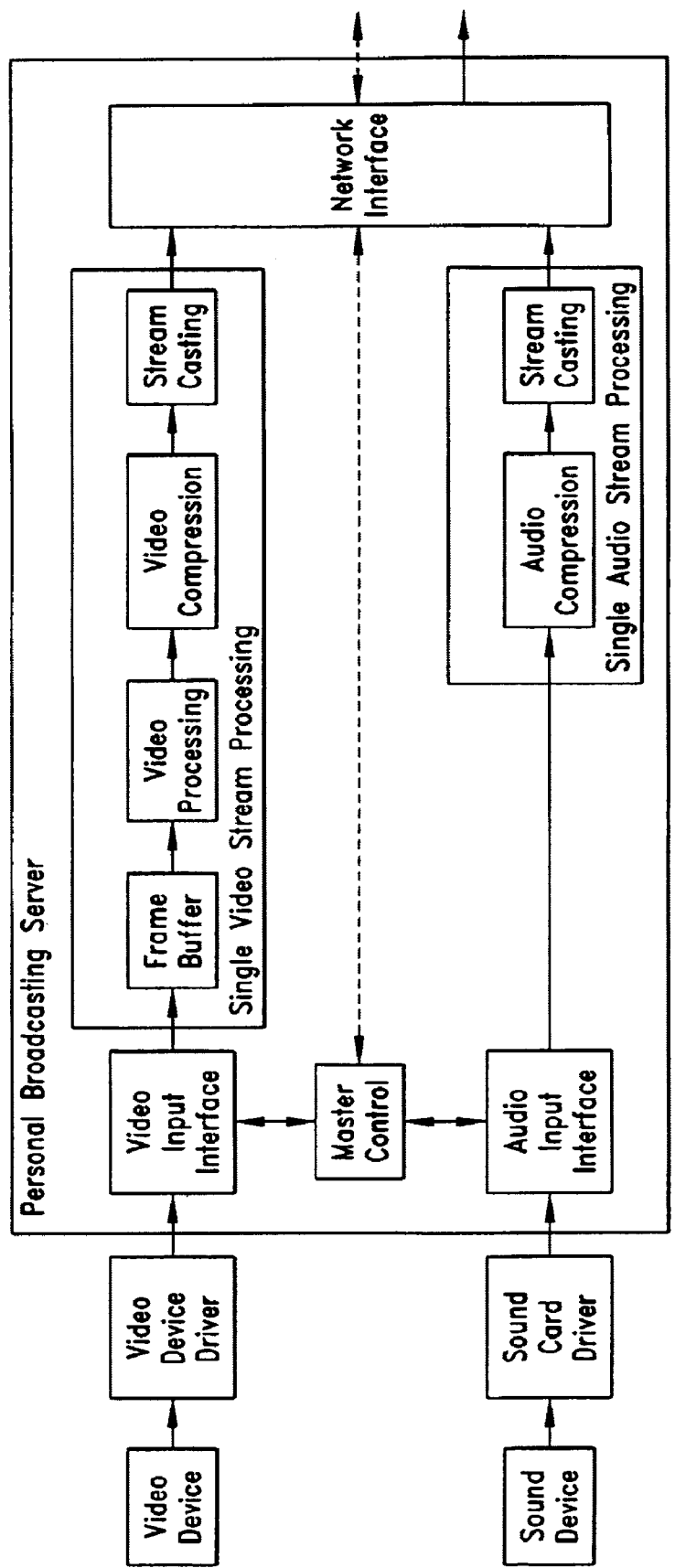
Figure 2E:
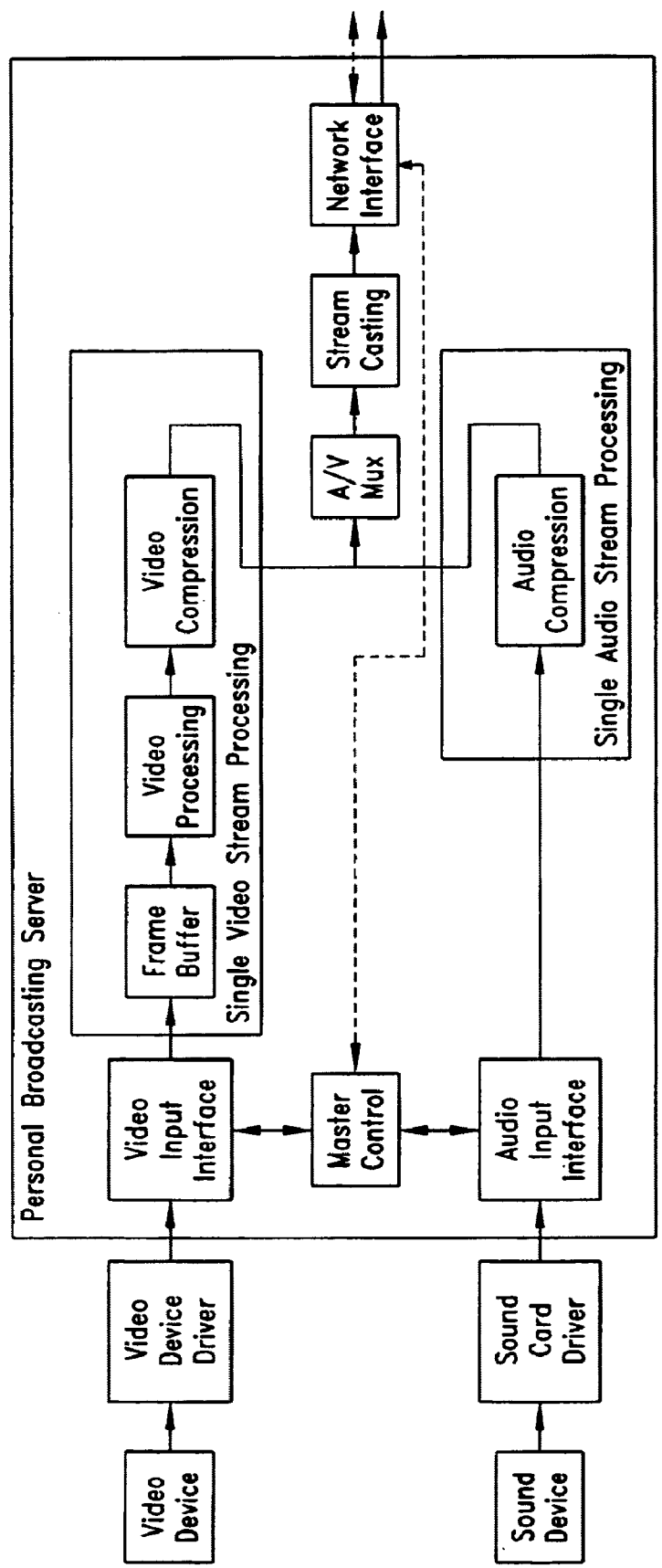

An example of a personal broadcasting server according to the present invention can be provided by any one or a combination of the simplified diagrams of FIGS. 2C to 2D. As shown, the server 250 receives video data from video device 251, which couples to driver device 252. The server 250 also receives audio data from sound device 268, which couples to sound card driver 267. Master control 261 communicates between video interface 253, audio interface 262, and network interface 260, as well as other blocks. Video data enters video input interface, which transfers the video into a series of blocks 254 including frame buffer 255, video processing 256, video compression 257, stream casting 258, and network interface 259. Additionally, audio transfers through the audio input interface, which transfers the audio through a sequence of blocks 266 including audio compression 263, stream casting 264, and network interface 265. Each of these blocks carry out functionality common known in the art as well as described above and throughout the present specification. The personal broadcasting server generally receives video data in a first format and converts such video data into a second format for transmission over to a client device, which is coupled to the network. Here, the video data in the first format cannot effectively be used by the client device.

If implemented in hardware or partially in hardware, an efficient multiplexer or cross-bar mechanism can be used for embodiments of the present invention. If implemented in software, little if any additional hardware interconnections are typically required. Additionally, the above description in terms of specific hardware is merely for illustration. It would be recognized that the functionality of the hardware be combined or even separated with hardware elements and/or software. The functionality can also be made in the form of software, which can be predominantly software or a combination of hardware and software. One of ordinary skill in the art would recognize many variations, alternatives, and modifications. Details of a personal broadcasting process according to the present invention are provided below.

A personal broadcasting process according to an embodiment of the present invention is briefly described below:

1. Connect to personal broadcasting web server;
2. Register user to broadcast audio/video;
3. Set-up session for audio/video;
4. Activate broadcast;
5. Monitor broadcast;
6. Correct and/or archive broadcast, as necessary;
7. Terminate broadcast; and
8. Perform any other steps.

The above sequence of steps is merely an example. The steps can be performed on, for example, from a client device such as a personal computer or the like, which is coupled to the Internet. The steps provide an easy to use process for personally broadcasting audio/video information from a source to a client device. Preferably, the client device is mobile. The mobile client device includes the ones noted above as well as others. Details of the present process are described in more detail below in reference to the Fig.

Figure 3:
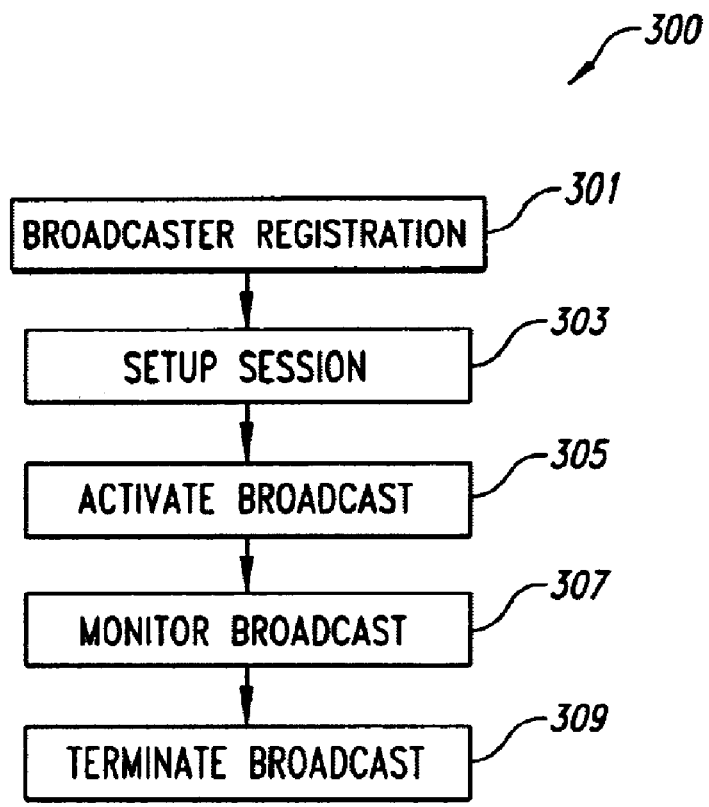
FIGS. 3 and 3A to 3D are simplified flow diagrams illustrating broadcasting methods according to embodiments of the present invention.

FIG. 3 is a simplified flow diagram 300 illustrating a personal broadcasting method according to an embodiment of the present invention. This diagram is merely an example, which should not unduly limit the scope of the claims herein. One of ordinary skill in the art would recognize many other variations, modifications, and alternatives. As shown, the flow diagram includes a variety of steps, but begins with a registration process, step 301, which is followed by steps of setting up a session (step 303), activating the broadcast (step 305), monitoring the broadcast (step 307), and terminating the broadcast (step 309), among others, if desired. Here, a client device (a personal broadcasting audio/video server) connects to a personal broadcasting web server, which is coupled to a worldwide network of computers, such as an internet or the Internet. The web server can be similar to the one noted above, but can also be others. The client device can include a personal computer, a personal digital assistant, a pager, a personal computer, a notebook computer, a laptop computer, and a workstation, among others.

Figure 3A:
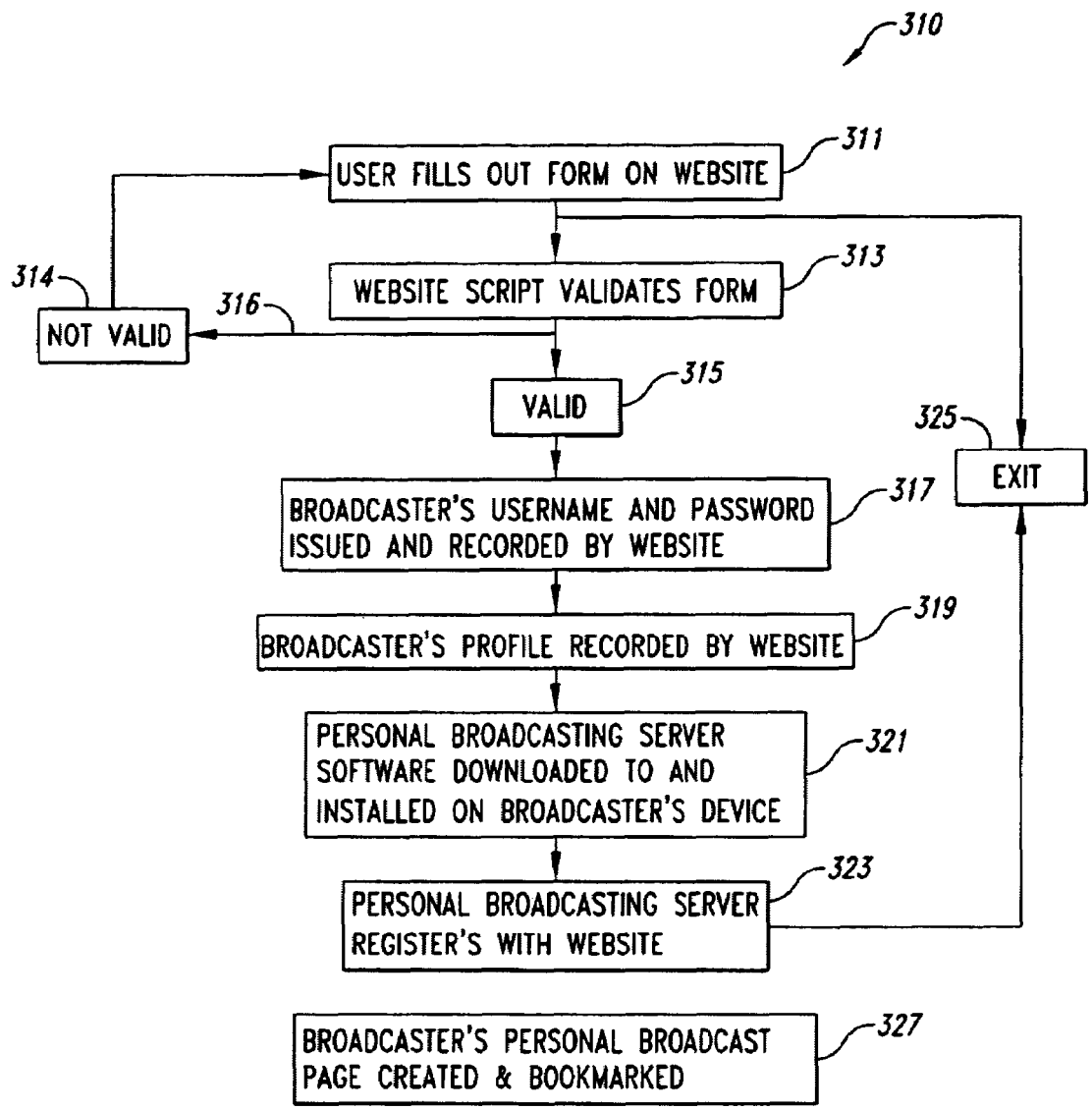

Next, the potential broadcaster registers (step 301) with the web site. FIG. 3A is a simplified flow diagram 311 illustrating a personal broadcasting registration method according to an embodiment of the present invention. This diagram is merely an example, which should not unduly limit the scope of the claims herein. One of ordinary skill in the art would recognize many other variations, modifications, and alternatives. Once the user is connected to the web site, the user (who is the potential broadcaster) fills (step 311) out a registration form on the web site. The registration form includes fields for a user name, password, profile information, and other information. The profile information can include a list of private viewers in various groups or a designation for public broadcasting. In some embodiments, it may also include demographics and other information, which may be used by marketers, advertisers, and other agents, in identifying product and other information, which may be of interest to the broadcaster. Profile information also includes details of the camera or other audio/video source device used by the broadcaster as well as the bandwidth available to the broadcaster, the processing unit, memory, and operating system of the broadcaster's server or computer. The registration form is entered from the client, which sends the form to the server via the network.

The web site script validates the form, step 313. If the form is valid, the method continues to the next step. Otherwise, the method returns via branch 316 to the form again, which continues until a predetermined number of times or becomes valid. The web site issues and records (step 317) the user name and password. Additionally, the profile information is recorded (step 319) by the web site. Next, the personal broadcasting server software is downloaded (step 321) from the web site onto the broadcaster's device. The personal broadcasting server registers (step 323) with the web site, using the downloaded software. The method ends at step, 325.

Optionally, the broadcaster's personal broadcast page is created and book marked, step 327. Here, the broadcaster can track the uniform resource locator (URL) of the broadcaster's personal web page. Once at this page, the broadcaster will often only need to click on a button on the web page in order to begin the broadcasting session. The broadcaster's personal broadcast page can be accessed by the broadcaster from anywhere on the Internet and not just from the broadcaster's personal computer and camera. Accordingly, the broadcaster can remotely setup, start, or stop a broadcasting session simply by clocking on a start button on the personal web page.

Figures 1, 3B:
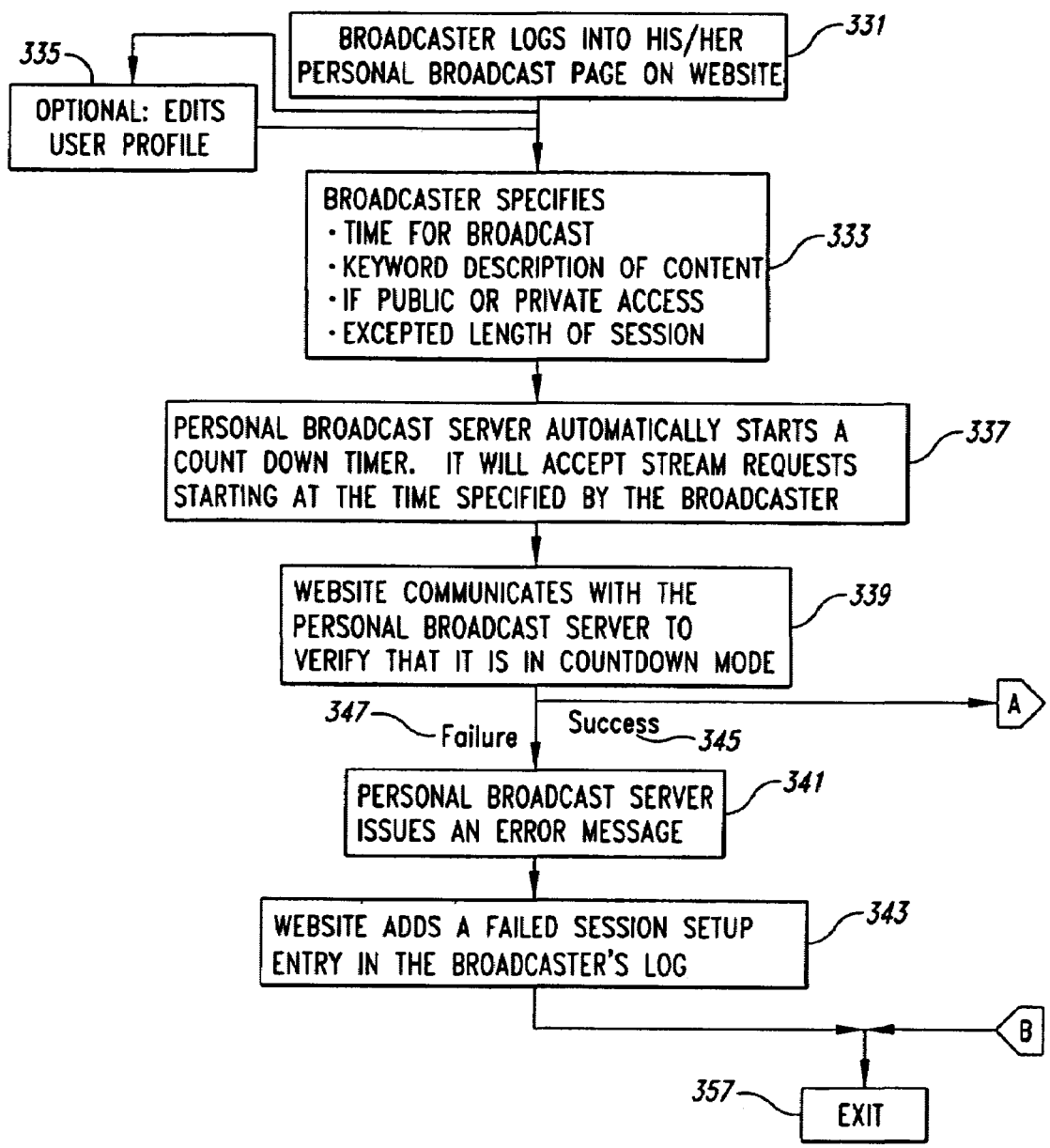
Figures 2, 3B:
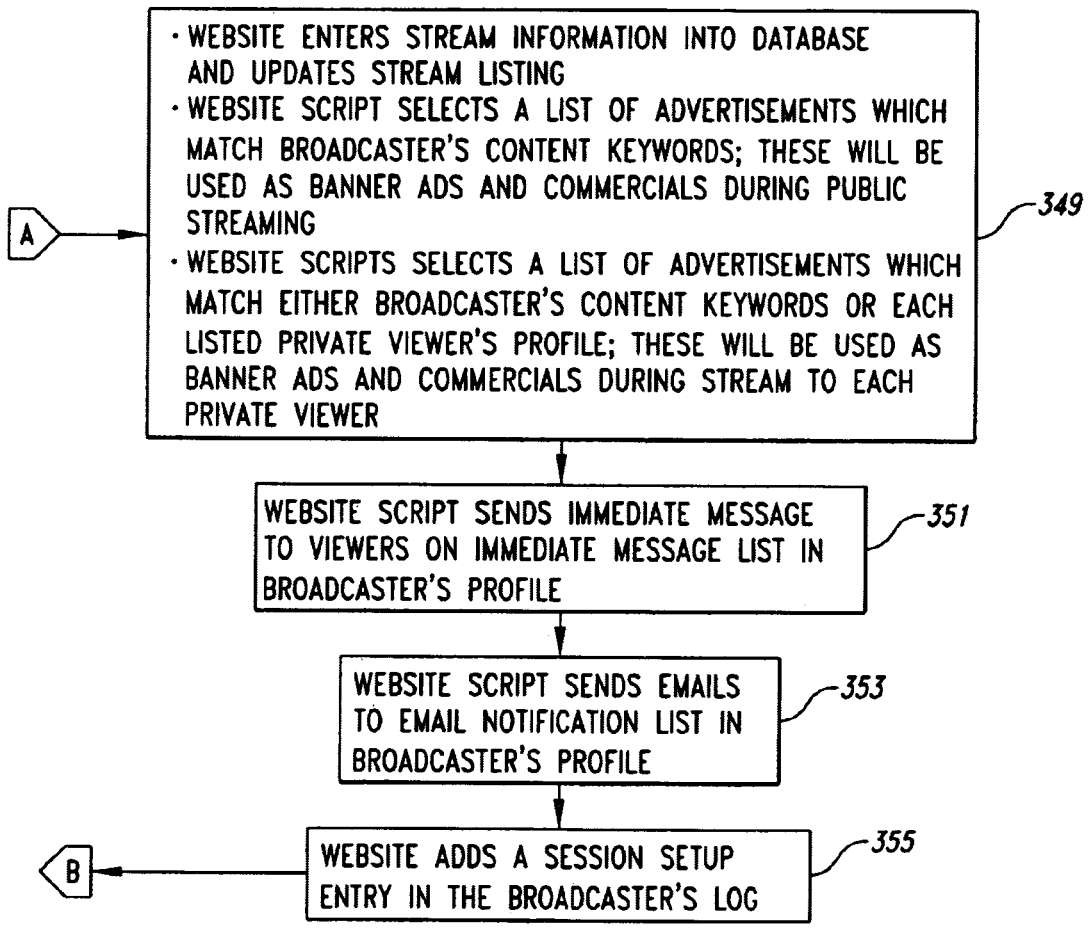

Once registration is completed and broadcasting software has been downloaded, the method sets up a broadcasting session. For example, FIG. 3B is a simplified flow diagram 330 illustrating a personal broadcasting setup session according to an embodiment of the present invention. This diagram is merely an example, which should not unduly limit the scope of the claims herein. One of ordinary skill in the art would recognize many other variations, modifications, and alternatives. The method begins by connecting a broadcaster's audio/video server onto the broadcasting web site. Next, the broadcaster logs (step 331) onto a designated web site, which is often the broadcaster's personal web page, such as the one noted above. Optionally, the broadcaster edits (step 335) the user profile, which was previously provided.

Next, the broadcaster specifies procedural information about the broadcast, step 333. In a specific embodiment, the broadcaster enters information such as time for broadcast, keyword or words of description of broadcast content (e.g., sports, family, personal, product demonstration), limit of access (e.g., public, private, group list), and excepted length of session, as well as other procedural information. This information is often entered as text information in fields on a graphical user interface. The text information including the procedural information is transferred from the broadcasting audio/video server to the web site of personal broadcasting server.

The broadcasting server begins a countdown time, including a zero for immediate start, step 337. The countdown time often begins automatically, but can also be initiated manually or semi-automatically. Once the designated start time has been reached, the broadcasting server is ready to accept stream requests from the client devices. Next, the web site from the personal broadcasting web server communicates with the broadcasting audio/video server to verify that it is in countdown mode. If the audio/video server is not in countdown mode, failure occurs, step 347. The broadcasting audio/video server outputs an error message, step 341, to the web site. The web site receives the error message and adds a failed session set entry into the broadcaster's log, step 343. Next, the method will exit, step 357, where the method can return back to one of the above steps or others.

If the countdown has been verified, the setup method is success, step 345, and processing of setup information (step 349) occurs at the web server. Here, the web site receives and enters stream information into a database, which is coupled to the server. In a specific embodiment, the web server may include advertisements or other information that may be attached to streaming video. Here, the web site script queries and then selects a list of advertisements from a data base which relate or match the broadcaster's content keywords. The web site script can also select a list of advertisements that relates to or match either broadcaster's content keywords or each listed private viewer's profile. Depending upon the specific embodiment, one or more of these process steps is provided.

Next, the web site script sends (step 351) messages to potential viewers of the broadcast on the immediate message list. In a specific embodiment, the messages can be sent using one of a variety of ways such as electronic mail (called e-mail), instant messaging, paging, faxing, and others. The web site script sends (step 353) e-mail messages based upon an e-mail notification list. The e-mail notification list is on the broadcaster's personal profile or the like. The e-mail messages are derived from the personal broadcasting server and routed to one of a plurality of designated e-mail addresses via the world wide network of computers or the like. Once the messages have been sent, the web site adds a session set up entry into the broadcaster's log, step 355. Other steps can follow.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives.

Figure 3C:
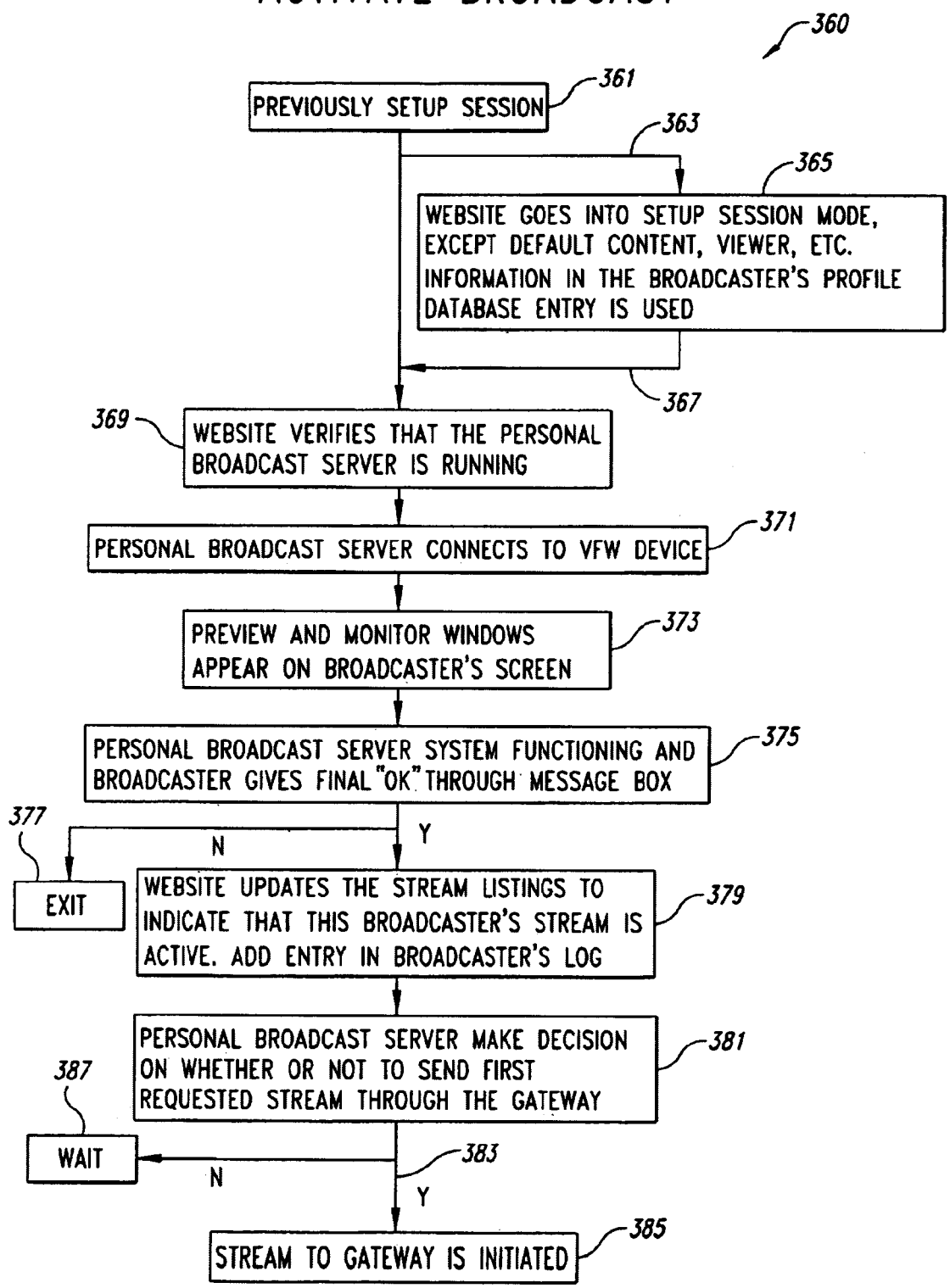

FIG. 3C is a simplified flow diagram 360 illustrating a personal broadcasting method for activating a broadcasting session according to an embodiment of the present invention. This diagram is merely an example, which should not unduly limit the scope of the claims herein. One of ordinary skill in the art would recognize many other variations, modifications, and alternatives. The present method begins where the previous setup session ended, step 361. Here, the method can initiate the web site to go back via branch 363 into the set up mode, step 365, where the broadcaster could update previously entered profile information. Alternatively, the web site uses the default settings in the personal profile via branch 367. The web site verifies that the personal broadcasting audio/video server is running, step 369.

Next, the broadcasting audio/video server connects to a video device compatible with Video for Windows™ by Microsoft Corporation, but can be others. Once connection has been established, the preview and/or monitor windows prompt onto the display coupled to the personal broadcasting audio/video server, step 373. The broadcaster previews and monitors information on the display. Next, the broadcaster gives final approval by providing information to a message box. The approval is transferred to the personal broadcasting web site. The method completes and goes to exit, step 377. Alternatively, the web site updates any of the stream listings to indicate that the broadcaster's stream is active. Such active status is provided into the broadcaster's log. Once the active status is provided, the personal broadcasting server decides if or not to send (step 381) the first requested stream to the gateway. In one embodiment, the personal broadcasting server waits, step 387. Alternatively, the broadcasting server initiates a stream of audio/video data via branch 383 to the gateway, which distributes the audio/video. Now the broadcasting system has been activated. Once the broadcasting system has been activated, the broadcaster can terminate the audio/video broadcast according to an embodiment of the present invention.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives.

Figure 3D:
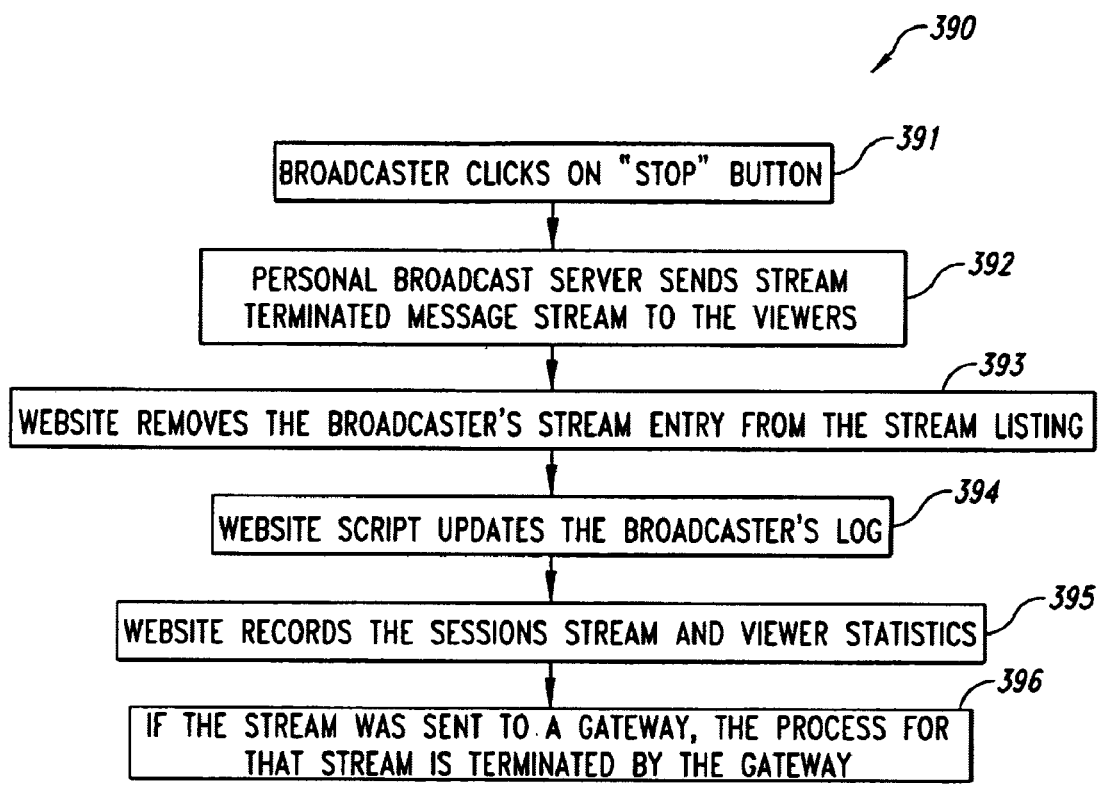

FIG. 3D is a simplified flow diagram 390 illustrating a personal broadcasting method according to an embodiment of the present invention. This diagram is merely an example, which should not unduly limit the scope of the claims herein. One of ordinary skill in the art would recognize many other variations, modifications, and alternatives. As shown, the broadcast terminates with, for example, a click of a stop button on the broadcaster's personal broadcasting page, step 391. Next, the personal broadcasting server sends a stream terminated message to viewers of the broadcast. The message originates from the broadcasting server, traverses through the PBWS, and is transferred to one of a plurality of client devices, which receive and display the broadcast.

The web site then removes (step 393) the broadcaster's stream entry from the stream listing. The web site script updates the broadcaster's log, step 394. In some embodiments, the web site also records the broadcasting sessions' stream and viewer statistics. In some aspects, these statistics can include, for example, length (or time) of broadcast, number of Megabits from personal broadcast server, average number of Megabits/stream from the personal broadcast server, number of streams served from the personal broadcast server, number of streams served from gateways on behalf of the broadcaster, keywords and other content or context information, characteristics (e.g., bandwidth, format, resolution, color depth, frame rate, contrast, brightness, source of stream (e.g., PBS or gateway)) of each unique or independent stream served, which is indexed by stream identification number, and identification of each of the viewers of the streams along with other information (e.g., stream identification number, start and/or stop times, archived stream start/stop times of each of the viewers, times at which instant replay is used, advertisements seen, average bit rate consumed, total bandwidth consumed), and other desirable information. Depending upon the embodiment, the method may terminate at the personal broadcasting server or the gateway. If the stream of audio/video has been sent (step 396) to the gateway, termination also occurs at the gateway in some embodiments.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives.

A personal broadcasting viewing process according to an embodiment of the present invention is briefly described below:

1. Connect the viewer client to web server;
2. Register viewer to receive broadcast of audio/video;
3. Input viewer client profile information;
4. Set-up stream configuration;
5. Select stream;
6. View stream;
7. Correct stream, as necessary;
8. Terminate stream; and
9. Perform any other steps.

The above sequence of steps provides an easy way to register a client device, which will receive the audio/video broadcast. Here, the steps generally use a step of direct information entry of profile information to provide the web server information for proper formatting of audio/video streams for compatibility purposes. Although the above sequence generally shows direct registration, automatic or indirect methods can also exist. One of ordinary skill in the art would recognize many other variations, modifications, and alternatives. In other embodiments, some of the above steps may not be performed, for example, steps 4 and 7 may not be executed. Details of these steps are provided below in reference to the Figs.

Figure 4:
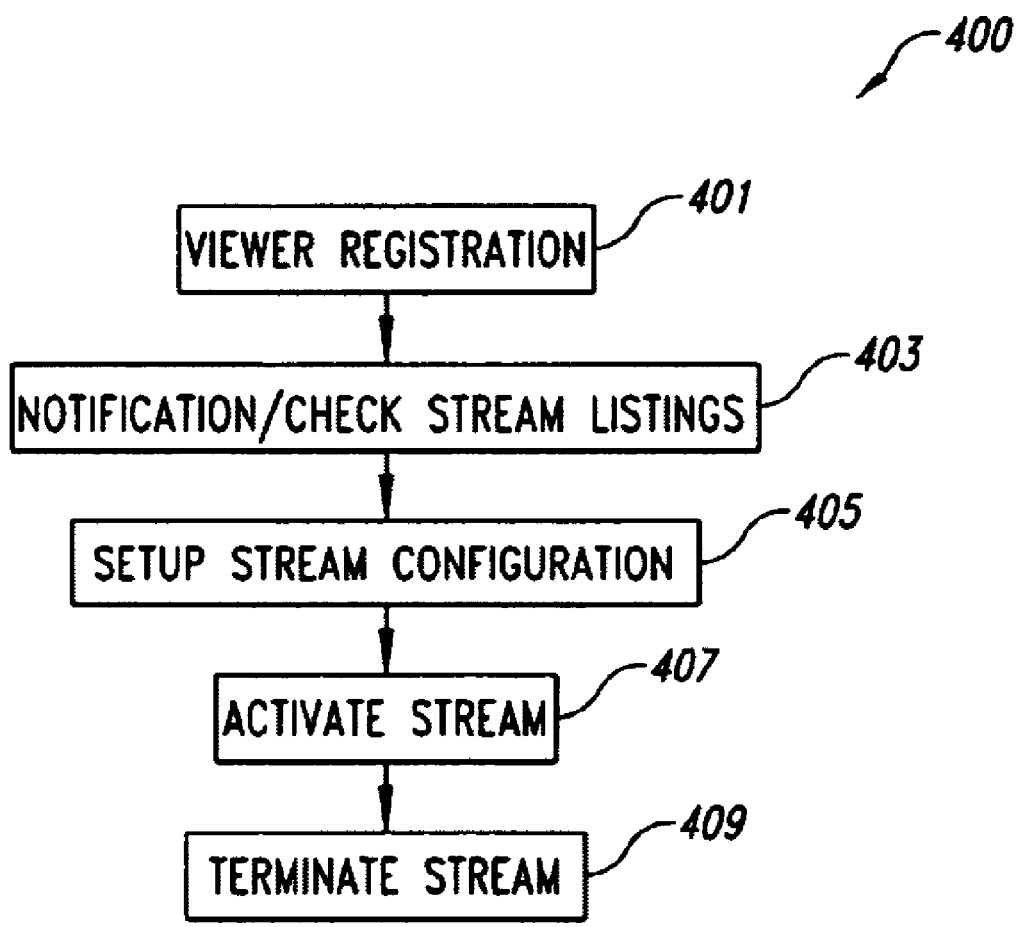
FIGS. 4 and 4A to 4B are simplified flow diagrams illustrating viewing methods according to embodiments of the present invention.

FIG. 4 is a simplified flow diagram 400 of a viewing process according to an embodiment of the present invention. This diagram is merely an example, which should not unduly limit the scope of the claims herein. One of ordinary skill in the art would recognize many other variations, modifications, and alternatives. As shown, the flow diagram 400 includes a variety of steps such as viewer registration (step 401), notification/check stream listings (step 403), setup stream configuration (step 405), activate stream (step 407), and terminate stream (step 409). The user of a client device such as the one noted as well as others registers the device. The client device can be mobile devices such as a cellular phone, a personal digital assistant, a laptop computer, a web appliance, a desktop computer, or any networked device capable of receiving and playing audio and/or video.

Figure 4A:
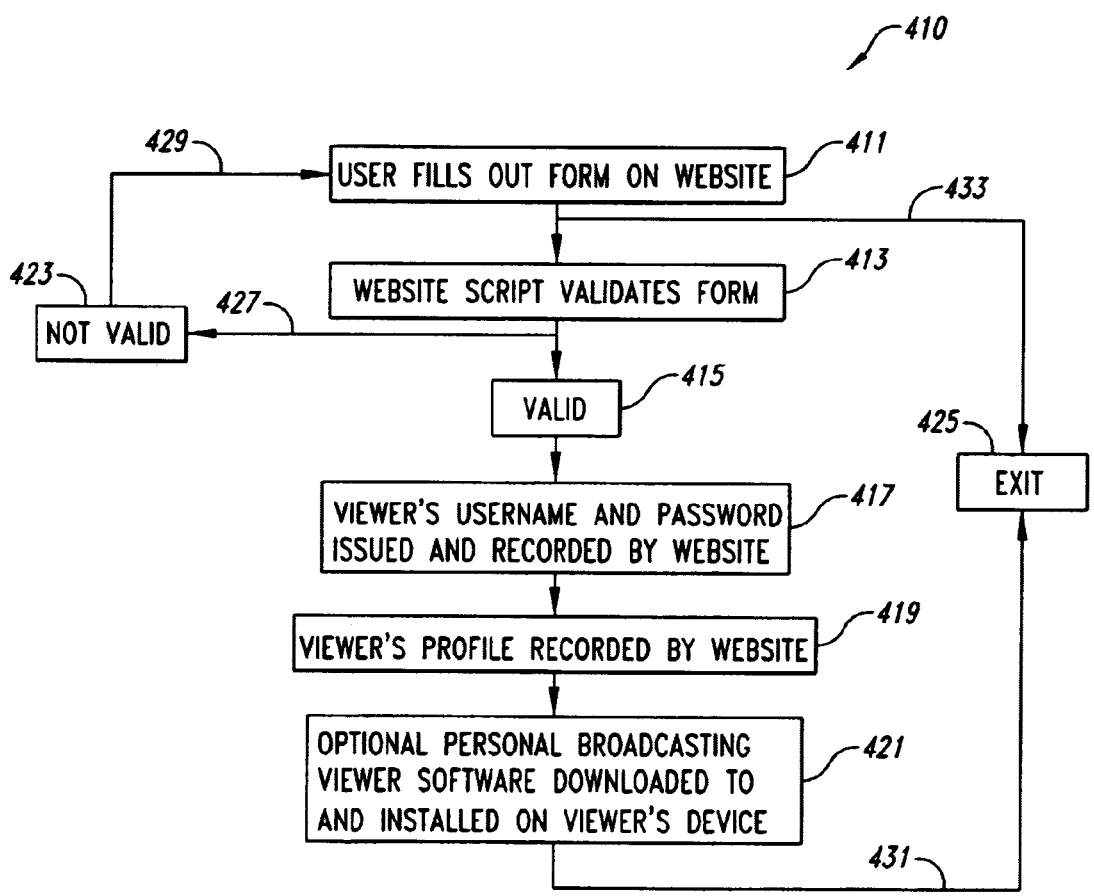

Registration specifies profile information about the user and the device so that the web server provides selected audio/video data to the client device. In a specific embodiment, user registration is provided by a method 410 illustrated in the diagram of FIG. 4A. This diagram is merely an example, which should not unduly limit the scope of the claims herein. One of ordinary skill in the art would recognize many other variations, modifications, and alternatives. The present method begins with a client device such as a viewer device. Here, the user fills (step 411) out a form on the web site. The client device can be connected to the web site or such form can be accessed through another client device including a personal computer, a workstation, and others.

The user enters profile information on the form. The form can include fields for a user name, password, profile information, and other information. The profile information can include a list of private viewers in various groups or a designation for public broadcasting. In some embodiments, it may also include demographics and other information, which may be used by marketers, advertisers, and other agents, in identifying product and other information, which may be of interest to the viewer. Profile information also includes details of the client device used by the viewer as well as the bandwidth available to the viewer, the processing unit, memory, and operating system of the viewer's client device. In a specific embodiment, the form is entered from the client, which sends the form to the server via the network.

Next, the form is sent to the web site from the client device where the web site script validates the form, step 413. Alternatively, the method goes to exit (step 425) via branch 433 to stop the method. If the form is valid (step 415), the method continues. Alternatively, the method loops back via branch 427, outputs an invalid prompt (step 423), and returns via branch 429 to step 411 where another form is prompted. If the form was valid, the method issues and records (step 417) the viewer's user name and password. Such user name and password are stored in memory of the web site. The viewer's profile is also recorded, step 419, by the web site.

Optionally, the method allows for software to be downloaded (step 421) from the web site to the client device. The software allows for selected audio/video processing features and control aspects at the client device. In certain embodiments, the client device is a mobile device, which has limited processing power and memory, as well as constrained by bandwidth. Accordingly, it is often desirable to provide limited processing software to the client device since such device is often "thin" as compared to processing power of the web site. Once the software has been downloaded, the method goes to exit (step 425) via branch 431.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives.

Figure 4B:
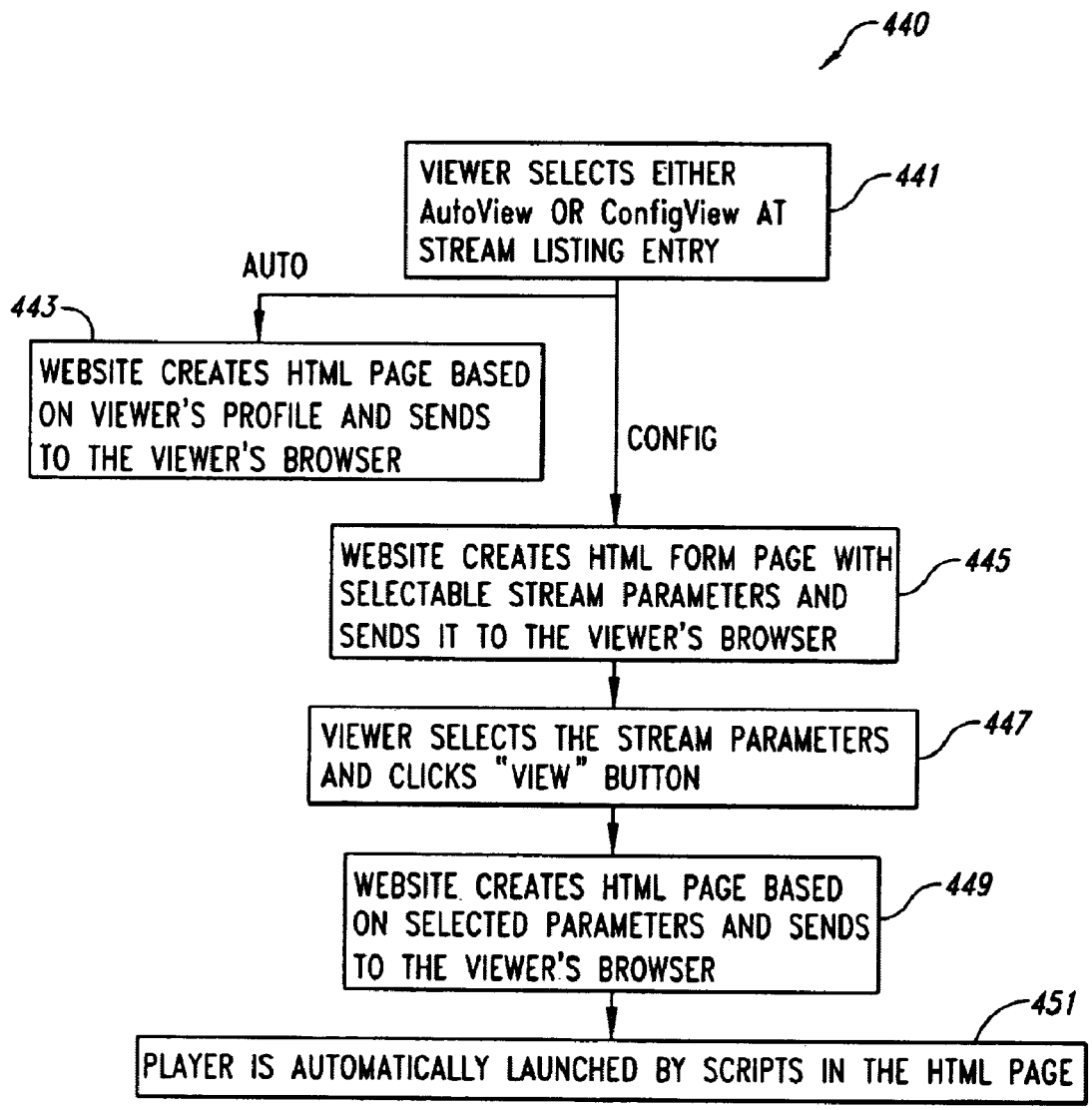

In a specific embodiment, the method has steps 440 for stream configuration, such as the one illustrated by FIG. 4B. This diagram is merely an example, which should not unduly limit the scope of the claims herein. One of ordinary skill in the art would recognize many other variations, modifications, and alternatives. As shown, the method begins where a viewer selects either an "autoview" or "configview" at stream listing entry. There may also be other selections in other embodiments. Entry is provided by a key, a click, voice, or other user interface device to the client.

In the autoview configuration, the method displays the audio/video data in a predetermined format. Here, the method executes step 433, where the web site creates an HTML page (or other standard based language) based upon the viewer's profile, which was previously entered, and sends the HTML page to the viewer device through a network. Once the HTML page has been sent to the viewer device, it is ready to receive streaming video.

In an alternative configuration, the viewer selects various parameters for a streaming video session. Here, the method allows for the web site to create (step 445) an HTML form on the page with fields for selected stream parameters. The HTML form is sent from the web site to the viewer device through the network. The HTML form is prompted at the viewer device through the browsing device. Next, the viewer selects (step 447) the stream parameters. Here, the user can merely click on the desired parameters or enter the desired parameters through an interface device. The desired parameters through the form are sent back to the set site for configuration of the streaming session.

Next, the web site forms an HTML page from the parameters that were sent. The HTML page is transferred from the web site to the viewer device through the network, step 449. The viewer device receives the HTML page, and launches scripts of the HTML page automatically, step 451. Once the scripts have been launched, the setup method may be completed. Next, the method can activate the stream (step 407) by clicking on a start button. The stream can also be terminated (step 409) by clicking on a stop button. Alternatively, the stream can stop automatically once the streaming audio/video data has ceased.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives.

FIG. 5 illustrates an embodiment of the present invention. In particular, FIG. 5 illustrates look-up-tables (LUTs) used in embodiments of the present invention.

In the present embodiment, a client device that is to receive a stream of video data will typically have characteristics associated with it. These characteristics are typically specified by a user of the client device when the user registers the client device, for example in step 419, above. In an alternative embodiment, the client device may automatically include some indicia or characteristics of the client device such as a manufacturer code, product code, and the like, along with the request for the stream of video data.

In the present embodiment, typical types of indicia may include the type of video player, the type of device it is, the bandwidth connection, the video player, the processor speed, and the like. In other embodiments, other types of indicia can also be used.

The indicia is typically sent to the personal broadcasting site, and in response a series of look-up-tables (LUTs) are then accessed. The data returned from the LUTs are then sent to transcoder 217, and the like. In particular, the control block 215 in FIG. 2A may then specify the amount of subsampling or supersampling required by sampler block 229, the number of frames per second to frame rate block 230, the color depth to color depth block 231, the target bit rate to bit rate control block 233, the type of video encoding (compression) scheme to encoder block 235; possibly an encryption key to encryptor block 237; the network protocol; and the like.

FIG. 5 illustrates an embodiment of the present invention. In particular, FIG. 5 illustrates look-up-tables (LUTs) 500 used in one embodiment. The LUTs 500 are typically embodied as a data structure in a memory, and control block 215, or the like access the LUTs 500 using the indicia. The output from LUTs 500 are then sent to transcoder 217, as described above.

One LUT 501 is typically used to specify the network protocol used by stream caster 219. As illustrated, one column of the table represents a type of player, and the other column represents a packetizing protocol. In one embodiment, if the client device is a device compatible with a LuxPlayer, provided by the assignee of the present invention disclosure, a real-time packeting protocol (RTP) is used. In alternative embodiments, other real-time protocols can also be used, for example, UDP, RTSP, or the like.

In another embodiment of the invention, if the client device is not compatible with the LuxPlayer, the packetizing protocol used is a transmission control protocol (TCP). In other embodiments, the use of other packetizing protocols is envisioned and other classes of players is also envisioned.

In the present embodiment, LUT 502 is typically used to specify the color depth of the video stream output to the client device. In particular, the first column represents classes of client devices, and the second column represents color bit depth data that is passed to color depth reducer block 231. In the present embodiment, client devices that are cellular telephones are provided 1 bit-depth video images; conventional PDAs are provided 2 bit-depth images; WindowsCE devices are provided 4 bit-depth video images; and personal computers are provided 24 bit-depth video images.

In alternative embodiments, the classes of client devices can be subdivided and further sub-classes of devices be defined. For example, one sub-class of non-WindowsCE PDAs may have an assigned bit-depth of 4 bits; one sub-class of cellular telephones may have an assigned bit-depth greater than 1 bit; and the like. Further, other classes of devices may be developed and included in the future. For example, networked appliances may be assigned 8 bit-depth video images, or the like; further, classes of devices may be defined per manufacturer and/or model of devices. The LUT 502 therefore is merely an illustration of a general concept.

LUT 503 illustrates a LUT associated with the frame rate delivered to the client devices. As illustrated, the frame rate provided, in terms of frames per second, depends upon the quality of service (QoS) bandwidth. In other words, the number of fps for video data provided to the client device depends upon the network connection to the client device. As illustrated in FIG. 5, the lower the bandwidth in bits per second the lower the number of frames per second of video image.

LUT 503 is merely illustrative of one possible set of relationships. In alternative embodiments, the relationships may be modified. For example, with 14.4 Kbps service, the number of frames per second may be 0.5; further, with a 56 Kbps service, the number of frames per second may be 8 fps; or the like.

The output from LUT 503 is typically input into frame rate block 230 for processing, as described above. Many different representations of such data are contemplated in embodiments of the present invention.

In this example, LUT 504 illustrates one possible set of relationships between a video player, processor, the color bit-depth on a client device and a stream format. For example, based upon the first three columns, the type of stream format is output from LUT 504. In one example, if the client device includes a browser and has an output capable of handling more than 2 bits of color information, the output stream format is a MotionJPEG (MJPEG).

The stream format is then typically input to encoder block 235. In response, encoder block 235 encodes (compresses) the video data according to the requested format. In embodiments of the present invention, LUT 504 may be changed and different mappings between player, bit-depth, processor, and the like may be assigned. Further, a greater number of characteristics may be included to the LUT to add additional LUT entries to LUT 504.

In the present embodiment, LUTs may exist for other parameters, than the one illustrated in FIG. 5. For example, the bit rate of the video data stream may also be determined in response to a LUT associated with bit rates. Further, in this example, the resolution of the video data generated is, by default, set to the display resolution. In alternative embodiments a LUT may be used to lower the resolution of the video data in response to other parameters.

In other embodiments, audio data may similarly be transcoded to meet the appropate needs of a client device. For example, the bit rate may be reduced depending upon the QoS described above, and the like.

Figures 6, 7:
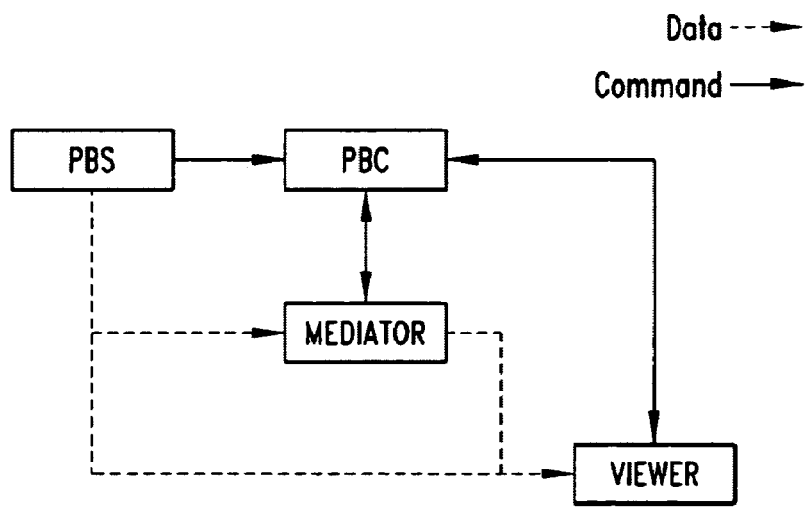
FIG. 6 illustrates an embodiment of the present invention.
FIGS. 7, 8, and 9 are simplified diagrams of an embodiment of a personal broadcasting system according to an embodiment of the present invention.

FIG. 6 illustrates an embodiment of the present invention. More particularly, FIG. 6 illustrates typical inputs to LUTs according to embodiments of the present invention and outputs from the LUTs.

As illustrated in FIG. 6, a client device may be a personal digital assistant (PDA) from PALM COMPUTING, such as the PALMVII, and the like. As is known, the PALM VII is powered by a 16-bit processor, runs upon PALMOS, includes a rudimentary web browser, has a 160×120 bit display, and has a wireless bandwidth of approximately 14 kbps.

In response to such data, the LUTs are then used to determine parameters for the video data stream to be sent to the PALMVII. For example, referring to LUT 500, the player does not support the LuxPlayer, thus the packet protocol should be TCP based. Next, because the device type is a PDA, LUT 501 returns a bit-depth of 2 bits. Referring to LUT 502, the bandwidth of the connection is 14 kbps, thus the frame rate is set to 1 frame per second. Finally, in this embodiment, referring to LUT 503, the player is a browser, and the color depth is 2 bits, thus the encoding (compression scheme for the video data is determined to be a MotionGIF format. The outputs from the LUTs are then used to create a video data stream tailored for the client device.

In the present embodiment, the parameters illustrated above, such as 16-bits, and the like, are also stored in a LUT. In such a LUT, the data are associated with a device identifier that is dynamically received from the client device. For example, the client device sends a device identifier that may specify a manufacturer or model number, or the like. In response the identifier is used to refer to the LUT discussed above, and in response the LUT specifies the characteristics of the client device. In another embodiment, for each client identifier, a protocol type, color depth, frame rate, and the like are associated in a single LUT.

Alternatively, when the user registers her client device, she may specify that her client device is a PalmVII. Thus, when the user requests a video data stream, the client device is already known, thus the characteristics can be easily retrieved. Alternatively, when the user requests a video data stream, the exact parameters of the protocol type, color depth, or the like are directly retrieved.

EXAMPLE

To prove the principles and operation of the present invention, experiments can be performed to implement the present invention. Here, the present invention provides for an acquisition and delivery of audio and video information from a USB PC camera to any device, which is capable of decoding and displaying ACELP audio and MPEG-1 video. Management, stream initiation, stream viewing, and other functions can be implemented or hosted on a web page of its own server or a web page of a general portal such as Yahoo!™ or others. The page can include hyperlinks for a variety of features such as registration, broadcasting, and viewing. The agents and database behind this web page will be termed "Directory Services."

A broadcaster performs a one-time registration of his/her camera with the Directory Services via the Personal Broadcasting Central web page at the general portal. This action will lead to the following:

1. A Personal Broadcasting Server (PBS) installation package will be downloaded to the Broadcaster's computer. PBS is the ActiveX control that will be launched via interaction with a general portal web page (see below) and which will stream MPEG-1 compressed video and ACELP compressed audio from the Broadcaster's machine to the Internet.

2. The Directory Services will update its listing to reflect the Broadcaster's information.

3. A log in ID and password will be issued to the Broadcaster.

4. A Personal Broadcasting Page will be created specifically for that Broadcaster. It is this page that the Broadcaster will interact with whenever he/she wants to initiate or stop a session.

5. A cookie will be placed on the Broadcaster's PC. This will provide for immediate access to the personal broadcasting page.

6. Other actions to be defined by general portal.

A viewer performs a one-time registration with the Directory Services at the general portal. This action will lead to the following:

1. A Personal Viewer (PerView) installation package will be downloaded to the Viewer's computer. PerView is the plug-in which will be launched via the web page (see below) and which will decompress and display MPEG-1 compressed video and ACELP compressed audio streams.

2. The Directory Services will update its listing to reflect the Viewer's information.

3. A cookie will be placed on the Viewer's PC. This will allow the Directory Services to identify the Viewer whenever he/she connects.

4. Other actions to be defined by the general portal.

When a Broadcaster is ready to stream, he/she navigates to the personal broadcasting page on which there will be "Start" and "Stop" buttons. By clicking on either the Start or Stop button, the Broadcaster enables or disables streaming from his/her machine. These buttons will be linked to PBS ActiveX control. The Start button activates PBS and notifies the Directory Services that the particular camera is broadcasting. It also notifies (via email or some instant messaging mode) a list of people that the Broadcaster has specified in his/her personal broadcasting page. The Broadcaster also specifies that the current session is to be either private or public. If it is private then those registered viewers whom the Broadcaster has listed in his/her profile will be notified and allowed to connect to the stream; the Directory Services will do this by matching viewer id's against the notification list. If the session is public, then the camera will be listed by Directory Services on its public page.

Viewers choose streams either from the stream listing page. If a private stream is chosen, Directory Services verifies the Viewer's ID (presented by the cookie on his/her machine) against the list of allowed ID's. The PBWS then issues the Viewer a page from which he/she can configure the desired stream (or do an AutoView). The configuration parameters, along with source and destination IP addresses pass as a new stream request to the PBWS. The PBWS then passes these to the gateway (see below) which, in turn, determines if these parameters are allowed and respond to the Directory Services. If the parameters are allowed, the Gateway decides to direct the stream either directly from the Broadcaster to the Viewer, or have the stream go through the Gateway on its way to the Viewer. Later, when the Gateway HW is deployed, further processing by the Gateway will be possible.

At a high level, the broadcasting system includes a variety of elements such as:

1. PBS software for the streaming of audio and video from the USB cameras. There can be multiple streams of audio and video; each stream may have unique characteristics.

2. Gateway software (version 1) for the management of streams between the USB cameras and client displays. The Gateway makes decisions such as:

(a) Are requested streams possible?

(b) Should streams be sent through the Gateway or directly from PBS to the Viewer.

It is also maintains statistics on the streams. In principle, we expect that many instances of the Gateway software will be run; the PBWS is responsible for load balancing these.

3. Client decoder software for the decompression of MPEG-1 and ACELP audio streams. These are separate MPEG-1 (YUV out) and ACELP (PCM out) decoder libraries.)

4. Client player software (such as PerView™ by Luxxon Corporation) for the display of the decompressed streams.

5. Personal Broadcasting Central (PBWS) web server (registration agents, camera hosting interface, client viewing interface) software and hardware.

Figure 8:
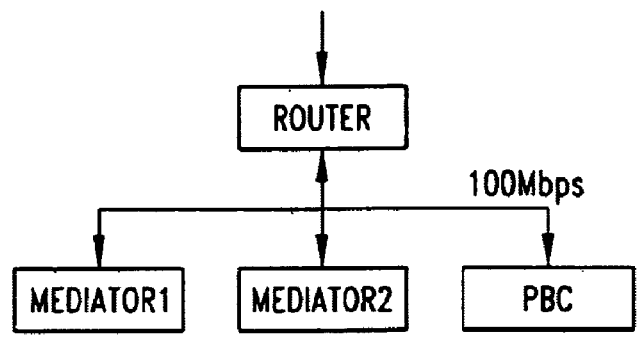
Figure 9:
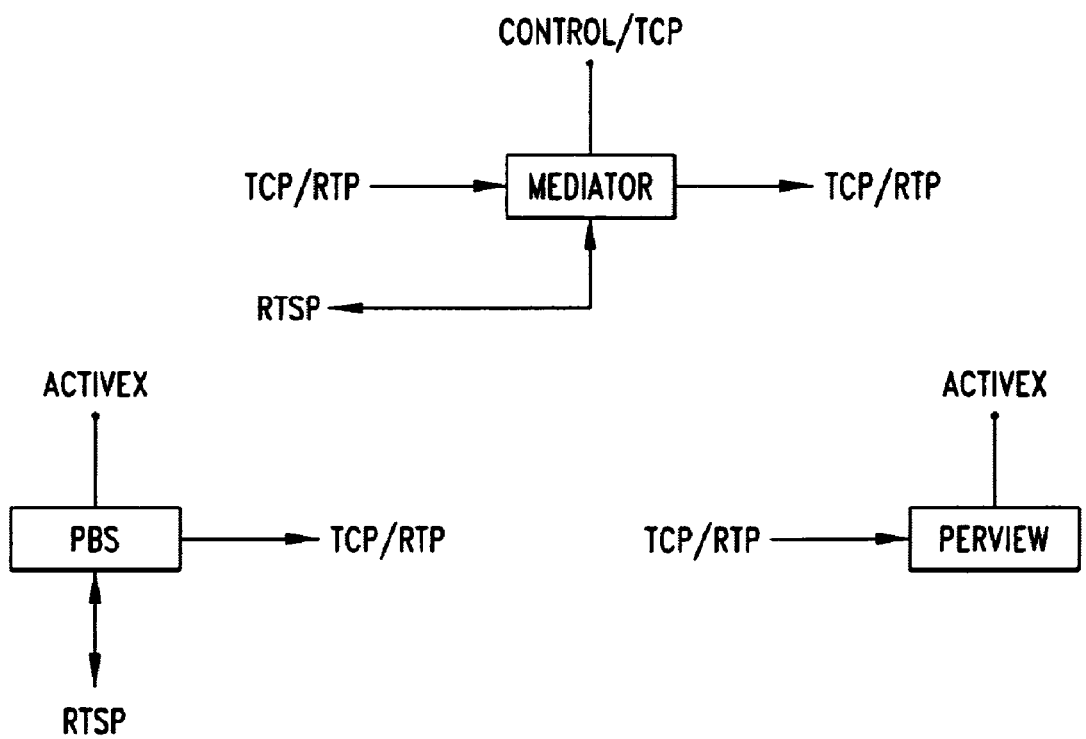

As merely an example, FIG. 7 is a simplified diagram of high level system architecture according to the present experiment. This diagram is merely an illustration which should not unduly limit the scope of the claims herein. One of ordinary skill in the art would recognize many other variations, modifications, and alternatives. As shown, the diagram includes elements such as PBS coupled to PBWS. Also shown is a gateway and viewer. Here, the dotted lines represent data and the command lines are shown in the solid lines. In one embodiment, the present networked structure of the PBWS-Gateway sub-system is expected to be on a 100 Mbps or greater LAN as shown in the simplified diagram of FIG. 8. As shown, the interfaces include TCP or RTP for data, TCP or RTSP for control, ActiveX, and there may be others.

Additional protocol information about commands and messages between the various elements are provided below. For easy readying, the elements have been provided under the underlined headings.

Gateway:

The protocol between the Gateway and the PBWS often requires that the PBWS issue commands to the Gateway along with parameters (see below) which define the streams and connections to broadcasters and viewers. The commands are:

| COMMANDS/MESSAGES | DESCRIPTION |
| --- | --- |
| ApproveStreamRequest | PBWS asks the Gateway to approve a stream which a potential viewer has requested. |
| NewStream | PBWS registers and starts a new streams with the Gateway. |
| StopStream | PBWS requests that the Gateway terminates a stream which is currently running. |
| GetStreamStatus | PBWS requests that Gateway returns statistics and other information on a particular stream. |
| StreamError | Gateway notifies the PBWS that an error has occurred with a particular stream. |

Each Gateway generally includes a PENTIUM III 500 MHz by INTEL CORPORATION, a 128 MB or greater SDRAM, WINDOWS NT by MICROSOFT CORPORATION, and two 100 Mbps Ethernet NICs.

Personal Broadcasting Server:

Version 1 of the PBS will perform as follows:

| METRIC | TARGET | |
| --- | --- | --- |
| Output frame rates | MPEG frame rates up to 15 fps, but fixed for each stream | |
| Output resolutions | Configurable from VGA down | |
| Output chroma modes | 4:2:0 only | |
| Output Video formats | Format | Resolution |
| | MPEG-1,2 | VGA or less |
| | JPEG, GIF | VGA or less |
| Major Stream Parameters | Resolution | Bandwidth |
| | Color Depth | Format |
| | Frame Rate | |
| Stream Controls | Start stream | |
| | End stream | |
| # Concurrent Streams | Up to 8 (depends on bandwidth and CPU) | |
| Output Color Depths | (24 bit 4:2:0 YcbCr) (1 bit BW) (8 bit gray scale) (8 bit color) | |
| Audio | Format | Bandwidth |
| | ACELP | 5 kbps |

In other embodiments, audio can include formats such as MP1, MP2, MP3, G.723.1, and H.263 and MPEG-4 video. PBS defines an ActiveX control interface for the following actions from a form based web page:

| ACTION | DESCRIPTION |
| --- | --- |
| Start Button Click | Starts the PBS allowing either clients or the Gateway to initiate streams. |
| Stop Button Click | Terminates the streaming session. |
| Video On/Off Check | Allows Broadcaster to turn off video (default is on) |
| Audio On/Off Check | Allows Broadcaster to turn off audio (default is on) |
| Preview Type List Box | Allows user to select from No preview Local preview Stream preview |

The following parameters define the stream to be produced and sent from the PBS to either the Gateway or the PerView:

| PARAMETER | DESCRIPTION |
| --- | --- |
| IPADDR | Destination IP address |
| WIDTH | The width of the video frames |
| HEIGHT | The height of the audio frames |
| BITRATE | The target bit-rate for the stream |
| FRAMERATE | The target frame rate for the stream |
| CONTRAST | The contrast gain setting [−15, 15] |
| BRIGHTNESS | The brightness shift setting [−15, 15] |
| COLORFLAG | The color depth |
| VIDEO FORMAT | The compression format for the video 0 - no video 1 - MPEG-1 |
| AUDIO FORMAT | The compression format for the audio 0 - no audio 1 - ACELP |
| UNUSED | For future use |

The PBS often requires elements including PII 300 MHz or greater, at least 64 MB SDRAM, Win98, at least a 56 kbps modem connection with IP address, Microsoft compliant USB Camera, Microphone, and Microsoft compliant sound card w/ speakers.

PerView:

For design and testing purposes, we have developed an MPEG-1, -2 and ACELP and MP2 audio player called Personal Viewer (PerView). PerView as an embedded application in a web page is launched. The web page is prepared and returned to the Viewer by the Gateway. It contains the following parameters that define its interface to both the Gateway and PBS:

| PARAMETER | DESCRIPTION |
| --- | --- |
| PARAMKEY | Key to be used in decrypting param |
| DATAKEY | Key to be used indecrypting data |
| IPADDR | IP address of the source stream/camera |
| VPORT | The port # of the video source |
| APORT | The port # of the audio source |
| WIDTH | The width of the video frames |
| HEIGHT | The height of the audio frames |
| BITRATE | The target bit-rate for the stream |
| FRAMERATE | The target frame rate for the stream |
| CONTRAST | The contrast gain setting [−15, 15] |
| BRIGHTNESS | The brightness shift setting [−15, 15] |
| COLORFLAG | The color depth (0 = grayscale, 1 = 24 bit color) |
| PLAYDURATION | The number of seconds to continue playing |
| VIDEO FORMAT | The compression format for the video 0 - no video |

-continued

| PARAMETER | DESCRIPTION |
|---|---|
| AUDIO FORMAT | 2 - MPEG-1<br>The compression format for the audio<br>0 - no audio<br>1 - ACELP |
| UNUSED | For future use |

The PerView includes at least a PENTIUM II, 300 MHz or greater device by INTEL CORPORATION, at least 64 MB SDRAM, WIN98 or higher by MICROSOFT CORPORATION, at least 56 kbps modem connection with IP address, and MICROSOFT compliant sound card w/ speakers. In the present example, the above parameters are encoded in the web page as a string of characters which must often be decrypted by the PARAM key. The key itself is passed as a parameter in the web page. The encryption/decryption method is often known to be PerView application, PBWS, and PBS.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for transferring real time video information from a source device to one of a plurality of output devices, the system comprising:
    at least one image capturing device to acquire video information, the image capturing device including a processor, a graphics module coupled to the processor, a browsing device coupled to the processor, a packetizing portion coupled to the processor, the packetizing portion being adapted to convert the video information into a single packetized stream of video information, the single packetized stream of video information being in a first format, and an output device coupled to the processor to transfer the single packetized stream of video information to a network;
    a network gateway coupled to the image capturing device through the network, the network gateway being coupled to a worldwide network of computers, the network gateway including a gateway transcoding device to transcode the single packetized stream of video information from the first format into multiple compressed output streams of video information having different second compression formats, the network gateway also including a packetizing portion to transfer the compressed output streams of video information in the second compression formats to the network; and
    at least one display device coupled to the network gateway through the world wide network of computers to convert one of the compressed output streams of video information that it receives into video information for display, the display device having a display for displaying the video information on the display device;
    wherein the first format is selected from compressed and uncompressed audiovideo formats; and
    wherein the network gateway can provide the multiple compressed output streams of video information, having the different second compression formats and which were transcoded from the single packetized stream of video information having the first format, with unique sets of audiovisual characteristics, from which at least one compressed output stream can be selected to be displayed on the display.

2. The system of claim 1 wherein the gateway transcoding device decodes the single packetized stream of video information having the first format, and then re-encodes the decoded single stream of video information into the multiple compressed output streams having the second formats.

3. The system of claim 1 wherein the display device is coupled to a wireless network, the wireless network being coupled to the world wide network of computers.

4. The system of claim 1 wherein the display device is selected from one of a plurality of devices including a portable computer, a laptop computer, a personal digital assistant, a web appliance, a personal computer, and a work station.

5. The system of claim 1 wherein the first format, if compressed, is different in compression type from the second compression formats.

6. The system of claim 1 wherein the second compression formats are selected from the group consisting of MPEG-1, MPEG-2, MPEG-4, H.263, M-JPEG, M-GIF, ACELP, MP1, MP2, MP3, and G.723.1.

7. The system of claim 1 wherein the image capturing device is a video camera.

8. The system of claim 1 wherein the network gateway comprises a look up table.

9. The system of claim 1 wherein the image capturing device is coupled to a personal computer that is coupled via a wireless medium to the network.

10. The system of claim 1 wherein the display device can select the compressed output stream to display on its display.

11. The system of claim 1 wherein a component of the network gateway can select the compressed output stream to be displayed by the display device.

12. A system for broadcasting to at least one mobile display device, the system comprising:
    a processor; and
    a broadcasting server coupled to the processor and coupled to a wide area network of computers, the broadcasting server including:
        an image retrieval portion configured to retrieve at least one incoming video signal in a first format;
        a look up table to determine parameters for second compression formats for the at least one incoming video signal; and
        a transcoding module coupled to the image retrieval portion and to the look up table, the transcoding module configured to transcode the at least one incoming video signal from the first format into a plurality of second compression formats corresponding to a plurality of compressed output video signals in response to the parameters;
    wherein at least one of the second compression formats is more appropriate for the at least one mobile display device than the first format; and
    wherein either or both a video and audio characteristic associated with the at least one incoming video signal can be changed during transmission to provide a different optimized compressed output video signal to the at least one mobile display device in response to a change in any combination of a bandwidth condition, a display device characteristic, and a user preference.

13. The system of claim 12 wherein the image retrieval portion is configured to receive the at least one incoming video signal from a video camera.

14. The system of claim 12 wherein the image retrieval portion is configured to receive the at least one incoming video signal from a data file.

15. The system of claim 12 wherein transcoding module decodes the at least one incoming video signal having the first format, and then encodes resulting signals to provide the output video signals having the second compression formats.

16. The system of claim 12 wherein the second compression formats are selected from a group consisting of MPEG-1, MPEG-2, MPEG-4, H.263, M-JPEG, M-GIF, ACELP, MP1, MP2, MP3, and G.723.1.

17. The system of claim 12 wherein the parameters from the look up table includes pixel bit-depth data.

18. The system of claim 12 wherein the parameters from the look up table includes frame rate data.

19. A system for transferring real time video information from a source device to one of a plurality of output devices, the system comprising:
- an image capturing device to acquire video information, the image capturing device including a processor, a graphics module coupled to the processor, a browsing device coupled to the processor, a packetizing portion coupled to the processor, the packetizing portion being adapted to convert the video information into a single packetized stream of video information, the single packetized stream of video information being in a first format, and an output device coupled to the processor to transfer the video information to a network;
- a network gateway coupled to the image capturing device through the network, the network gateway being coupled to a worldwide network of computers, the network gateway including at least one gateway transcoding device to transcode the single packetized stream of video information from the first format to a plurality of compressed output streams of video information having respective second compression formats, the network gateway also including a packetizing portion to transfer the compressed output streams of video information in the second compression formats to the network; and
- a display device coupled to the network gateway through the world wide network of computers to convert at least one of the compressed output streams of video information into video information for display, the display device having a display to display the video information on the display device; and
- wherein the network gateway can provide a listing of the plurality of compressed output streams of video information having respective second compression formats, each compressed output stream having unique characteristics, and wherein one or more compressed output streams can be selected to be displayed on the display of the display device, the network gateway further being able to adapt any one of the compressed output streams to change at least one of a video and audio characteristic associated with that selected compressed output stream during its transmission.

20. The system of claim 19 wherein the single packetized stream of information in the first format is compressed.

21. The system of claim 19 wherein the display device is coupled to a wireless network, the wireless network being coupled to the world wide network of computers.

22. The system of claim 19 wherein the display device is selected from one of a plurality of devices including a portable computer, a laptop computer, a personal digital assistant, a web appliance, a personal computer, and a work station.

23. The system of claim 19 wherein the first format is different in compression type from the second compression formats.

24. The system of claim 19 wherein the first format is selected from a group consisting of MPEG-1, MPEG-2, MPEG-4, H.263, M-JPEG, M-GIF, ACELP, MP1, MP2, MP3, and G.723.

25. The system of claim 19 wherein the image capturing device is a video camera.

26. The system of claim 19 wherein the network gateway comprises a look up table.

27. The system of claim 19 wherein the image capturing device is coupled to a personal computer that is coupled via a wireless medium to the network.

28. The system of claim 19 wherein the display device can select the compressed output stream to be displayed.

29. The system of claim 19 wherein a component of the network gateway can select the compressed output stream to be displayed by the display device.

30. A system for broadcasting to at least one mobile display device, the system comprising:
- a processor; and
- a broadcasting server coupled to the processor and coupled to a wide area network of computers, the broadcasting server including:
  - an image retrieval portion configured to retrieve at least one incoming video signal in a first format;
  - a look up table to determine parameters for a plurality of second compression formats, more suitable for at least one mobile display device, for the at least one incoming video signal; and
  - at least one transcoding module coupled to the image retrieval portion and to the look up table, the transcoding module configured to transcode the at least one incoming video signal from the first format into a plurality of compressed output video signals having the second compression formats in response to the parameters;
- wherein at least one of the second compression formats is more appropriate for the at least one mobile display device than the first format; and
- wherein multiple compressed output video signals having the at least one second compression formats more suitable for the at least one mobile display device can be provided by the broadcasting server, wherein an optimum one of the multiple compressed output video signals can be selected to be presented at the mobile display device.

31. The system of claim 30 wherein the image retrieval portion is configured to receive the at least one incoming video signal from a video camera.

32. The system of claim 30 wherein the image retrieval portion is configured to receive the at least one incoming video signal from a data file.

33. The system of claim 30 wherein transcoding module decodes the at least one incoming video signal, and then re-encodes resulting signals into the compressed output video signals having the second compression formats.

34. The system of claim 30 wherein the first format is selected from a group consisting of MPEG-1, MPEG-2, MPEG-4, H.263, M-JPEG, M-GIF, ACELP, MP1, MP2, MP3, and G.723.1.

35. The system of claim 30 wherein the parameters from the look up table includes pixel bit-depth data.

36. The system of claim 30 wherein the parameters from the look up table includes frame rate data.

37. The system of claim 30 wherein the display device can select the compressed output video signal to be presented.

38. The system of claim 30 wherein a component of the broadcasting server can select the compressed output video signal to be presented.

39. A system to broadcast to at least one client device, the system comprising:
- a processor; and
- a broadcasting server coupled to the processor, the broadcasting server including:
  - an image retrieval portion to retrieve at least one incoming video signal having a first format;
  - a data structure usable to determine parameters for second compression formats for the at least one incoming video signal; and
  - at least one transcoding module coupled to the image retrieval portion and which has access to the data structure, the transcoding module being capable to transcode the at least one incoming video signal from the first format into multiple compressed output video signals having respective second compression formats based at least in part on the parameters;
- wherein at least one of the second compression formats is more suitable for the at least one client device than the first format; and
- wherein the multiple compressed output video signals having the at least one second compression format more suitable for the at least one client device can be provided by the broadcasting server, wherein any one of the multiple compressed output video signals can be selected to be presented at the at least one client device.

40. The system of claim 39 wherein the at least one client device can select which of the compressed output video signals to present and may access the selected compressed video signals from multiple devices, including access of compressed output video signals having different second compression formats from different devices.

41. The system of claim 39 wherein a component of the broadcasting server can select which of the compressed output video signals is to be presented by the at least one client device.

42. The system of claim 39 wherein a different compressed output video signal can be dynamically selected to be presented at the at least one client device, instead of a current compressed output video signal, in response to a change in a bandwidth condition.

43. The system of claim 42 wherein the different compressed output video signal has at least one of a different frame dimension and a different associated audio characteristic.

44. A system for broadcasting to at least one client device, the system comprising:
- a means for processing incoming video signals; and
- a broadcasting server coupled to the processor, the broadcasting server including:
  - an image retrieval means for retrieving at least one incoming video signal having a first format;
  - a data structure means usable for determining parameters for second compression formats for the at least one incoming video signal; and
  - a transcoding module for transcoding the at least one incoming video signal from the first format into a plurality of compressed output video signals having the second compression formats based at least in part on the parameters;
- wherein at least one of the second compression formats is more suitable for the at least one client device than the first format; and
- wherein multiple compressed output video signals having the second compression formats more suitable for the at least one client device can be provided by the broadcasting server, wherein any one of the multiple compressed output video signals can be selected to be presented at the at least one client device.

45. The system of claim 44, further comprising a means for allowing the at least one client device to select one of the multiple compressed output video signals to be presented.

46. The system of claim 44 wherein the broadcasting server includes a means for selecting one of the multiple compressed output video signals to present at the at least one client device.

47. The system of claim 44 wherein the broadcasting server includes a means for dynamically selecting a different compressed output video signal to be presented at the at least one client device, instead of a current compressed output video signal, in response to a change in bandwidth conditions.

48. The system of claim 44 wherein the means for dynamically selecting the different compressed output video signal includes a means for dynamically selecting a compressed output video signal having at least one of a different frame dimension and different associated audio.

* * * * *